(12) United States Patent
Malaba et al.

(10) Patent No.: US 9,856,435 B2
(45) Date of Patent: Jan. 2, 2018

(54) POLYURETHANE/POLYACRYLIC HYBRID DISPERSIONS FOR SHINE APPLICATIONS IN HOME CARE

(71) Applicant: Lubrizol Advanced Materials, Inc., Cleveland, OH (US)

(72) Inventors: Dennis N. Malaba, Uniontown, OH (US); Feng-Lung Gordon Hsu, Broadview Heights, OH (US); Jeffrey A. Fruscella, Mentor, OH (US); Smita Brijmohan, Brecksville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/423,800

(22) PCT Filed: Aug. 26, 2013

(86) PCT No.: PCT/US2013/056581
§ 371 (c)(1),
(2) Date: Feb. 25, 2015

(87) PCT Pub. No.: WO2014/039302
PCT Pub. Date: Mar. 13, 2014

(65) Prior Publication Data
US 2015/0315527 A1 Nov. 5, 2015

Related U.S. Application Data

(60) Provisional application No. 61/696,467, filed on Sep. 4, 2012, provisional application No. 61/711,784, filed on Oct. 10, 2012.

(51) Int. Cl.

| | | |
|---|---|---|
| C11D 1/00 | (2006.01) |
| B08B 3/04 | (2006.01) |
| C11D 3/37 | (2006.01) |
| C09D 175/06 | (2006.01) |
| C09D 175/14 | (2006.01) |
| C11D 17/00 | (2006.01) |
| C08G 18/48 | (2006.01) |
| C08G 18/66 | (2006.01) |
| C08G 18/72 | (2006.01) |
| C08G 18/75 | (2006.01) |
| C08G 18/76 | (2006.01) |
| C08G 18/08 | (2006.01) |
| C08G 18/12 | (2006.01) |
| C09D 175/04 | (2006.01) |
| C08G 18/32 | (2006.01) |
| C08G 18/34 | (2006.01) |
| C08G 18/40 | (2006.01) |
| C08G 18/42 | (2006.01) |
| C08L 75/04 | (2006.01) |
| C09G 1/16 | (2006.01) |
| C08K 5/00 | (2006.01) |
| C08K 5/32 | (2006.01) |

(52) U.S. Cl.
CPC ........ *C11D 3/3726* (2013.01); *C08G 18/0823* (2013.01); *C08G 18/0852* (2013.01); *C08G 18/0866* (2013.01); *C08G 18/12* (2013.01); *C08G 18/3206* (2013.01); *C08G 18/348* (2013.01); *C08G 18/4018* (2013.01); *C08G 18/4238* (2013.01); *C08G 18/4808* (2013.01); *C08G 18/4825* (2013.01); *C08G 18/4833* (2013.01); *C08G 18/4854* (2013.01); *C08G 18/6611* (2013.01); *C08G 18/6625* (2013.01); *C08G 18/724* (2013.01); *C08G 18/755* (2013.01); *C08G 18/758* (2013.01); *C08G 18/765* (2013.01); *C08L 75/04* (2013.01); *C09D 175/04* (2013.01); *C09D 175/06* (2013.01); *C09D 175/14* (2013.01); *C09G 1/16* (2013.01); *C11D 17/0013* (2013.01); *C11D 17/0017* (2013.01); *C08K 5/0058* (2013.01); *C08K 5/32* (2013.01)

(58) Field of Classification Search
CPC ..... C11D 1/00; C11D 3/3726; C11D 17/0017; B08B 3/04
See application file for complete search history.

(56) References Cited

U.S. PATENT DOCUMENTS

2005/0153865 A1* 7/2005 Detering ............ C08G 18/0819
510/475

FOREIGN PATENT DOCUMENTS

| EP | 2338922 A1 | 6/2011 |
| WO | 99/67311 A1 | 12/1999 |
| WO | 2008/016843 A1 | 2/2008 |

* cited by examiner

*Primary Examiner* — Brian P Mruk
(74) *Attorney, Agent, or Firm* — Thoburn T. Dunlap

(57) ABSTRACT

A hard surface cleaning composition which provides a shine to hard surfaces and which is water resistant includes 0.001-50 wt. % of at least one detersive surfactant, at least 10 wt. % of a diluent, the diluent including water, and 0.01-40 wt. % of particles comprising at least one of an anionic polyurethane polymer and an anionic polyurethane hybrid polymer, formed as an aqueous dispersion, the particles having an average particle size of less than 170 nm.

33 Claims, No Drawings

POLYURETHANE/POLYACRYLIC HYBRID DISPERSIONS FOR SHINE APPLICATIONS IN HOME CARE

CROSS REFERENCE TO RELATED APPLICATION

This application claims priority from PCT Application Serial No. PCT/US2013/056581 filed on Aug. 26, 2013, which claims the benefit of U.S. Provisional Application No. 61/711,784 filed on Oct. 10, 2012 and on U.S. Provisional Application Ser. No. 61/696,467 filed on Sep. 4, 2012.

FIELD OF THE INVENTION

The exemplary embodiment relates to hard surface treatment formulations for enhancing shine on hard surfaces and finds particular application in the treatment of wood flooring and furniture.

BACKGROUND OF THE INVENTION

Treatment formulations are often used to clean and protect hard surfaces in the home. Home care hard surface cleaners, for example, are formulations containing surfactants and optionally a disinfectant to remove dirt, grease, and germs from hard surfaces such as wood, tile, stone, and stainless steel, which are found on floors, kitchen counters, appliances, and bathrooms in a typical home. The hard surface cleaning formulation may also contain ingredients for specific functions such as an antifoam agent, a wetting agent, a chelating agent, a co-solvent, a rheology modifier and a film-former. However, there can be a reduction in the gloss of a tile or other shiny substrate when a surfactant-containing formulation is applied to clean it. As a result, the substrate can still look dirty.

To mitigate the reduction in gloss, certain surfactants and blends of surfactants and solvents have been proposed. For example, U.S. Pat. No. 6,532,973 suggests the use of alkylpolyglucoside surfactants, US Pub. No. 2008/0188394 proposes amine oxide as a sole surfactant, and EP 1 021 400 B1 uses sulfosuccinamate in combination with selected nonionic surfactants. U.S. Pat. No. 4,822,514, EP 0 805 200 B1 and U.S. Pat. No. 5,380,452 suggest nonionic and anionic surfactant formulations for use in low-streaking and low-filming in hard surface cleaning formulations to retain or improve the gloss of treated surfaces. Residues from such formulations can, however, make the surface tacky and prone to fingerprints.

Another approach is to add a shine agent to the hard surface cleaning formulation to enhance the shine of the substrate. For example, US Pub. No. 20100022427 discloses polysiloxane-based compositions that are suited for use in toilet bowls to make the surface dirt-repellant. Although the siloxanes can provide shine to the substrate, they tend to make surfaces slippery, which could be hazardous to walk on if used on a floor surface. Also, siloxane-based polymers can degrade in acidic or basic pH and release volatile cyclic compounds, making them unsuited to use on counter-tops.

Adding a film-former to the hard surface cleaning formulation can sometimes provide shine and protection to the surface. For example, WO 02/36725, WO 97/13836 and U.S. Pat. No. 5,409,639 utilize water-soluble film-forming polymers for imparting gloss to the surface after cleaning. WO 97/13836 suggests sulfonated polystyrene homo- and copolymers for imparting shine and EP 1 678 285 B1 suggests the use of styrene-acrylate copolymers. However, the water resistance of the film after application may be poor, as such polymers are likely to be water-soluble or form hard-brittle films that can crack when exposed to water. As a result, the formulations may not provide a benefit once the applied formulation is wetted. The surface may also appear dull and damaged.

GB 2294942A and U.S. Pat. No. 7,501,026 suggest using hydrophobically modified ethoxylated polyurethanes as thickening agents for hard surface cleaning formulations in acidic pH. These polymers are water soluble and thus do not provide any water resistance to the treated substrate.

U.S. Pat. No. 8,206,511 describes a method of cleaning uncoated and coated hard surfaces using mechanical floor cleaning and polishing equipment with a formulation containing a gloss-enhancing agent for improved shine. The data suggest that gloss is improved as a result of the multiple polishing techniques used during floor cleaning, since formulations without a film forming agent appear to perform as well. For home care, formulations which require the use of specialized buffing and polishing equipment are undesirable.

Another type of hard surface care composition is furniture polish. These compositions typically contain oils and silicone polymers, which can provide temporary gloss. However, they are prone to transfer or vanish over a period of time.

INCORPORATION BY REFERENCE

The following references, the disclosures of which are incorporated by reference, are mentioned:

U.S. Pat. No. 6,897,281, issued May 24, 2005, entitled BREATHABLE POLYURETHANES, BLENDS, AND ARTICLES, by Lubnin, et al., discloses a breathable polyurethane having poly(alkylene oxide) side-chain units in an amount of at least about 30 wt. % that is suitable for coatings and films for textiles and other articles providing excellent breathability and high moisture vapor transmission rates U.S. Pat. No. 7,358,295, issued Apr. 15, 2008, entitled HYBRID POLYMER COMPOSITION, AND ARTICLE THEREFROM, by Miller, et al., discloses an anti-static polymer composition which includes a thermoformable, moldable, hybrid urethane-vinyl polymer composition which exhibits relatively low surface and volume resistivities and good toughness. The hybrid polymer composition can be made without volatile organic compounds such as solvents, neutralizing amines, or both.

U.S. Pat. No. 8,242,205, issued Aug. 14, 2012, entitled WATER DISPERSIONS OF NON-UNIFORM POLYURETHANE PARTICLES, by Lubnin, et al., discloses a method of preparing an aqueous dispersion of non-uniform polyurethane particles which comprises (a) preparing at least two isocyanate-terminated polyurethane prepolymers having different hydrophilicities; (b) preparing a uniform mixture of said prepolymers, and (c) dispersing the mixed prepolymers in an aqueous medium. The resulting dispersion of the prepolymers may be chain extended.

U.S. Pub No. 20090137734, published May 28, 2009, entitled AQUEOUS DISPERSIONS OF POLYURETHANE/ACRYLIC HYBRID COMPOSITIONS, by Anthony D. Pajerski, discloses an aqueous dispersion of polyurethane/acrylic polymer hybrid composites which is made by forming a mixture of urethane prepolymer or polymer, acrylic monomer or polymer, ketone functional molecule/oligomers, and hydrazine functional molecule/oligomers; and dispersing the mixture so made in aqueous medium.

BRIEF DESCRIPTION OF THE INVENTION

In one embodiment, a hard surface cleaning composition includes 0.001-50 wt. % of at least one detersive surfactant, at least 10 wt. % of a diluent, the diluent including water, and 0.01-40 wt. % of particles comprising at least one of an anionic polyurethane polymer and an anionic polyurethane hybrid polymer, as an aqueous dispersion, the particles having an average particle size of less than 170 nm.

In one aspect, a ratio of the polymer to the surfactant is from 0.002:1 to 30,000:1 by weight.

In one aspect, a ratio of surfactant to the at least one of the anionic polyurethane polymer and anionic polyurethane hybrid polymer is at least 0.05:1, or at least 0.1:1, or up to 150:1, or up to 20:1.

In one aspect, the particles have an average particle size of less than 150 nm.

In one aspect, the particles include particles of anionic polyurethane hybrid polymer, the particles of anionic polyurethane hybrid polymer having been prepared from at least one ethylenically unsaturated monomer in the presence of a preformed polyurethane polymer, whereby the particles of anionic polyurethane hybrid polymer include a polymer derived from the at least one ethylenically unsaturated monomer supported within particles of polyurethane polymer.

In one aspect, the particles include at least one of:

A. an anionic polyurethane polymer which is the reaction product of the following components:
  (i) 10-80 wt. % of at least one of a polyester polyol and a polyether polyol, the at least one of the polyester polyol and polyether polyol having a number average molecular weight of up to 4000 g/mol;
  (ii) 2-10 wt. % of a water dispersability enhancing monomer;
  (iii) 10-80 wt. % of a polyisocyanate; and
  optionally at least one of:
  (iv) a low molecular weight polyol which is other than a polyester polyol and a polyether polyol;
  (v) a chain extender/branching agent;
  (vi) a neutralizing agent; and
  (vii) a non-reactive diluent; and B. an anionic polyurethane hybrid polymer comprising:
  (1) an anionic polyurethane component which is the reaction product of the following components:
    (i) 10-80 wt. % at least one of a polyester polyol and a polyether polyol, the at least one of the polyester polyol and polyether polyol having a number average molecular weight of up to 4000 g/mol;
    (ii) 2-10 wt. % of a water dispersability enhancing monomer;
    (iii) 10-80 wt. % the polyisocyanate; and
    optionally, at least one of:
    (iv) a low molecular weight polyol which is other than a polyester polyol and a polyether polyol;
    (v) a chain extender/branching agent;
    (vi) a neutralizing agent; and
    (vii) a non-reactive diluent; and
  (2) an addition polymer which is the reaction product of the following components:
    (viii) at least one ethylenically unsaturated monomer; and
    (ix) an initiator.

In one aspect, the at least one of the polyester polyol and polyether polyol has a molecular weight of at least 200 g/mol, or at least 500 g/mol.

In one aspect, the at least one of the polyester polyol and polyether polyol has a molecular weight of up to 3000 g/mol, or up to 1500 g/mol.

In one aspect, the polyester polyol is derived from 1,6-hexanediol, neopentyl glycol, and adipic acid.

In one aspect, the water dispersability enhancing monomer includes at least one of a carboxylic acid-containing diol and a polyol having at least one pendent poly(alkylene oxide) side chain.

In one aspect, the water dispersability enhancing monomer includes a carboxylic acid-containing diol.

In one aspect, the carboxylic acid-containing diol includes a dihydroxy-carboxylic acid.

In one aspect, the neutralizing agent is present in sufficient amount to at least partially neutralize units of the polyurethane polymer derived from the carboxylic acid-containing diol.

In one aspect, the carboxylic acid-containing diol includes 2,2-bis(methylol)propionic acid.

In one aspect, the carboxylic acid-containing diol includes up to 10 wt. % of the total weight of components (i) to (vi).

In one aspect, the water dispersability enhancing monomer has a molecular weight of up to 200 g/mol.

In one aspect, the polyisocyanate includes dicyclohexylmethane diisocyanate.

In one aspect, the low molecular weight polyol has a molecular weight of less than 300 g/mol.

In one aspect, the low molecular weight polyol includes 1,4-butanediol.

In one aspect, the non-reactive diluent includes benzyl benzoate.

In one aspect, the neutralizing agent includes a tertiary amine.

In one aspect, the chain extender includes a polyamine.

In one aspect, the at least one ethylenically unsaturated monomer includes a (meth)acrylate monomer and a vinyl aromatic monomer.

In one aspect, the (meth)acrylate monomer includes a $C_1$-$C_5$ alkyl acrylate.

In one aspect, the $C_1$-$C_5$ alkyl acrylate includes methyl methacrylate and wherein units of the polyurethane hybrid polymer derived from the methyl methacrylate constitute no more than 32 wt. % of the hybrid polyurethane polymer.

In one aspect, the $C_1$-$C_5$ alkyl acrylate includes n-butyl acrylate.

In one aspect, the vinyl aromatic monomer includes styrene.

In one aspect, the composition includes the hybrid polymer and wherein a ratio of the polyurethane component B(1) to the addition polymer (B2) is from 10,000:1 to 1:1, or at least 2:1, or at least 5:1, or at least 10:1, or up to 3000:1, or up to 1000:1.

In one aspect, the composition includes the hybrid polymer and a ratio of the initiator, expressed in parts per hundred of the polymerizable ethylenically unsaturated monomers, to a concentration (expressed in wt. %) of units derived from the ethylenically unsaturated monomers in the hybrid polymer (I/A ratio) is 0.03 or less, or up to 0.025, or up to 0.02, or up to 0.015, or at least 0.005, or at least 0.01.

In one aspect, the at least one ethylenically unsaturated monomer is polymerized in the presence of an anionic polyurethane polymer which is the reaction product of at least the at least one of the polyester polyol and the polyether polyol; the water dispersability enhancing monomer; and the polyisocyanate.

In one aspect, the particles include an anionic polyurethane polymer or an anionic polyurethane component which is the reaction product of: 10-80 wt. %, or 20-60 wt. %, of the at least one of the polyester polyol and polyether polyol; 2-10 wt. % of a carboxylic acid-containing diol; 0-9 wt. % of a polyol having at least one pendent poly(alkylene oxide) side chain; 10-80 wt. % of the organic polyisocyanate; 0-5 wt. % of the low molecular weight polyol; 0-10 wt. % of the neutralizing agent; and 0-7 wt. % of the chain extending polyamine.

In one aspect, when the at least one of the polyester and polyether polyol is used at 40 wt. % or higher and wherein when the at least one of the polyester and polyether polyol is of molecular weight of 3000 g/mol or greater, the sum of portions of the low molecular weight polyol (less than 300 g/mol) and the branching polyol which is of a molecular weight less than 100 g/mol, is less than 0.8 wt. %.

In one aspect, the Leneta gloss of the dried composition is at least 60 gloss units.

In another embodiment, a method includes applying the composition of as described above to a hard surface to provide a dried film having a thickness of up to 50.8 μm and a delta gloss of at least 26 units at an angle of 60°.

In another embodiment, a method of forming a treatment composition includes forming a dispersion in water of at least one of an anionic polyurethane polymer and an anionic polyurethane hybrid polymer, the polymer being in the form of particles having an average particle size of less than 170 nm; combining the dispersion with of at least one detersive surfactant, optionally one or more formulation adjuvants, and optionally one or more organic diluents to form a treatment composition comprising 0.001-50 wt. % of the at least one detersive surfactant and 10-80 wt. % of the at least one of an anionic polyurethane polymer and the anionic polyurethane hybrid polymer.

In one aspect, the forming of the dispersion includes forming polyurethane particles, comprising reacting: (i) 10-80 wt. % of at least one of a polyether and a polyester polyol; (ii) 2.0-10.0 wt. % of a carboxylic acid-containing diol of molecular weight of up to 200 g/mol, (iii) 10.0-80.0 wt. % of an organic polyisocyanate, (iv) 0.0-10.0 wt. % of a low molecular weight polyol having a molecular weight of up to 300 g/mol, (v) 0.0-8.0 wt. % of a polyol having a pendent poly(alkylene oxide) side chain, (vi) 0.0-3.0 wt. % of a branching agent comprising a trifunctional polyol, and (vii) 0.0-7.0 wt. % of a chain extending polyamine of molecular weight less than 200 g mol. Optionally, the forming of the dispersion further includes forming solid polyurethane-acrylic/vinyl aromatic hybrid by forming a free-radical polymerization acrylic/vinyl aromatic polymer within the polyurethane particles which is a reaction product of: (viii) 30.0-90 wt. % of at least one $C_1$-$C_{22}$ alkyl ester of (meth)acrylic acid, (ix) 10.0-70.0 wt. % of at least one vinyl aromatic hydrocarbon monomer, and (x) 0.01-3.0 wt. % of initiator which is used to start the free radical polymerization.

In one aspect, when (viii) includes a $C_1$-$C_{22}$ alkyl ester of methacrylic acid, the total content of units derived from the $C_1$-$C_{22}$ alkyl ester of methacrylic acid in the solid polyurethane-acrylic/styrenic hybrid is no more than 32.0%.

In one aspect, a weight ratio of the free-radical polymerization acrylic/vinyl aromatic polymer to the polyurethane polymer is at least 0.001:1.

In one aspect, a weight ratio of the free-radical polymerization acrylic/vinyl aromatic polymer to the polyurethane polymer is up to 1:1.

In one aspect, the treatment composition includes 5-15 wt. polymer solids.

In another embodiment, a method includes applying the treatment composition formed by the method described above to a hard surface, and wherein a dried film of less than about 50.8 μm formed on the surface as an aqueous dispersion containing 13 wt. % polymer solids has a Δgloss measured at 60 degree angle of at least 26 units.

In another embodiment, an anionic aqueous polyurethane dispersion includes:
(A) 10.0-80.0 wt. % of a polymer which is the reaction product of:
  (i) 10.0-80.0 wt. % of a polyester or polyether polyol or combination thereof, having a molecular weight of 200 to 4000 g/mol,
  (ii) 0.0-9.0 wt. % of a polyol having a pendent poly(alkylene oxide) side chain,
  (iii) 2.0-10.0 wt. % of a carboxylic acid-containing diol,
  (iv) 0.0-3.0 wt. % of a polyol having a molecular weight less than 200 g/mol,
  (v) 10.0-80.0 wt. % of an organic polyisocyanate, and
  (vi) 0.0-7.0 wt. % of a chain extending polyamine of molecular weight less than 200 g mol;
(B) 0.01-10.0 wt. % of a non-reactive diluent, and
(C) 10.0-80.0 wt. % of water, and
wherein the mean particle size of the polymer particles is less than 170 nm.

In one aspect, a treatment composition includes the anionic polyurethane dispersion described above and at least one of a detersive surfactant and a disinfectant. In one aspect, the disinfectant includes a $C_1$-$C_6$ alcohol.

DETAILED DESCRIPTION OF THE INVENTION

Aspects of the exemplary embodiment relate to a hard surface treatment composition which includes a polyurethane-based polymer dispersion. The exemplary treatment composition imparts a shine to hard surfaces Another exemplary embodiment relates to a hard surface treatment composition including a polyurethane-based polymer dispersion which imparts a shine to hard surfaces and which is resistant to water degradation. Still another exemplary embodiment relates to a hard surface treatment composition including a polyurethane-based polymer dispersion which imparts a shine to hard surfaces, which is resistant to water degradation and which possesses stain resistance. The foregoing exemplary compositions do not render the hard surface to which they are applied slippery or tacky.

The treatment compositions are suited to use in home care for cleaning, polishing, and/or disinfecting of hard surfaces, such as floors, countertops, furniture, walls, and the like, that are formed from a variety of materials including wood, laminates, vinyl, ceramic, granite, stone, concrete, stainless steel, and the like. They find particular application in cleaning or refurbishing damaged wood flooring and in polishing furniture. The hard surface treatment composition can be applied by spray, aerosol spray, mop or wipe techniques and may be diluted with water or other solvent prior to application to a surface.

The exemplary polymer dispersion is an aqueous dispersion. This renders the formulation suited to use as an aqueous cleaner or polish. The polymers in the dispersion tend to swell in alcohol and thus can be used in disinfecting formulations.

The exemplary formulations are quick drying and leave a very thin coating on the hard surface due to the relatively low concentrations of polymers in the formulation. Despite the low polymer concentration, the treatment formulations can be used to enhance the shine of a treated hard surface and/or to mitigate the shine-reducing effects of other components of the hard treatment formulations. Additionally, the polymers can be resistant to degradation when exposed to water, and provide water and stain protection to the surface. While certain film-formers, when applied on hard surfaces may blister, crack or be damaged when exposed to water, leaving the surface looking dull and damaged, the exemplary polymer dispersions can inhibit such degradation.

In one embodiment, a hard surface cleaning composition includes the following components:
A. an aqueous anionic polyurethane-based dispersion comprising particles of an anionic polyurethane-based polymer A1,
B. a detersive surfactant,
C. optionally, one or more formulation adjuvants, such as wetting agents, antifoaming agents, thickeners, pH adjusting agents, solvents (other than water), disinfectants, colorants, chelating agents, and the like, and
D. a diluent, such as water.

In another embodiment, a hard surface disinfecting composition includes:
A. an aqueous anionic polyurethane-based dispersion comprising particles of an anionic polyurethane-based polymer A1,
B. optionally, a detersive surfactant,
C. a disinfectant, and optionally, one or more other formulation adjuvants, such as wetting agents, antifoaming agents, thickeners, pH adjusting agents, solvents (other than water), colorants, chelating agents, and the like, and
D. water.

In the following exemplary compositions, amounts of each of these components are given in which components A, B and C are expressed on a water-free basis, for ease of explanation, with the understanding that in formulating the exemplary compositions, at least the component A may be formulated with water prior to combining with other components of the formulation. Additionally, while the exemplary composition consists only of the above components, it is also contemplated that additional components may be present.

An exemplary hard surface treatment composition may include, based on the total weight of the composition:
A1. 0.001-30 wt. %, of polymer solids (particles) formed as an aqueous anionic polyurethane-based polymer dispersion,
B. 0.001-50 wt. % of the detersive surfactant,
C. 0-50 wt. %, in total, of one or more formulation adjuvants, and
D. a non-volatile diluent, e.g., as the balance, which may be entirely water or may include one or more organic solvents.

In some embodiments, component D may include, at least 0.1 wt. %, or at least 1 wt. %, or at least 10 wt. %, or at least 20 wt. % water, based on the total weight of the treatment composition. The water component may be derived, at least in part, from the dispersion of the polyurethane prepolymer in water.

All surfactant amounts mentioned herein are according to the weight of the active component.

A ratio of the polyurethane-based polymer A1 to detersive surfactant B, by weight, may be from 0.002:1 to 30,000:1, such as at least 0.05:1, or at least 0.1:1, or at least 1:1, and can be up to 150:1 or up to 20:1.

In one embodiment, the total actives (i.e., excluding water and other solvents) in the composition can range from 0.5-25%.

In one embodiment, component A1 is at least 1 wt. %, or at least 5 wt. %, or at least 10 wt. % of the composition.

In one specific embodiment, the aqueous dispersion includes polyurethane-based polymer A1 derived from: one or more polyester/polyether polyols, a water dispersing monomer, an isocyanate, and optionally one or more additional polyols and chain extending/branching monomers to provide particular characteristics of the polymer solids, and optionally, other components for forming the aqueous anionic polyurethane-based dispersion A. In particular, the component A2 may include a non-reactive organic diluent, which may also serve as a plasticizer.

Number-average molecular weight is the ordinary arithmetic mean or average of the molecular weights of the individual macromolecules. It is determined by measuring the molecular weight of n polymer molecules, summing the weights, and dividing by n:

$$M_n = \Sigma(n_i * M_i)/\Sigma n_i$$

The polyurethane polymer present in the composition may have a number-average molecular weight of at least 10,000, such as up to 1 million, or higher, such as at least 50,000, or at least 75,000. In some embodiments, $M_n$ is up to 500,000.

Particle Size

The component A1 is present in the composition as a dispersion in which the polyurethane-based polymer is in the form of particles. The particles in the dispersion can be polyurethane particles or hybrid polyurethane particles, in which case, the polymerized ethylenically unsaturated monomers are held within the structure of the polyurethane and particle size is similar.

Particle size can be defined as the mean diameter of particles that are generally spherical. For irregularly shaped particles however, it is the diameter of the equivalent sphere which has the same volume as the particle. Particle size of a dispersion is characteristically determined by not only the particle diameter, expressed in nanometers (nm), but in the frequency within a given size range which can be expressed as the particle size distribution. For the present application, it is useful to produce a dispersion which achieves a consistently fine particle size dispersion within a narrow distribution of particle diameters. Since most polymer materials have a Gaussian type of particle size distribution, the position of the maximum determines the mean particle diameter and the standard deviation represents the distribution width.

In practice, the smaller the particle size distribution, the more uniform the arrangement of the particles tends to be during the ordering and subsequent stages of the drying process and the more uniformly and efficiently the polymer will dry.

The mean particle size and particle size distributions can be measured by one of the following techniques: Sieve analysis, photoanalysis, optical counting, electroresistance counting, sedimentation, laser diffraction methods, acoustic spectroscopy or ultrasound attenuation spectroscopy.

For example, the particle size and size distribution of the exemplary dispersions and optionally their zeta potentials may be obtained using Malvern Zetasizer Nano-S90 with data analysis by Zetasizer Software 6.12 and NanoTrak™ particle size analyzer. This particle size analyzer provides measurements determined by particle counting using light scattering. Unless otherwise noted, all mean particle sizes mentioned herein are measured according to this method.

The particle size of the polyurethane/hybrid polymer particles in the dispersion and resulting composition is influenced by various factors, including the hydrophilic/hydrophobic balance of the overall composition. Exemplary factors, including some or all of the following, can affect particle size of the polyurethane particles:

(i) type and amount of water-dispersing monomer that is used in forming the polyester component,
(ii) type and amount of isocyanate,
(iii) type, amount and molecular weight of polyols,
(iv) type, amount and molecular weight of cross-linkers and chain extenders,
(v) molecular weight and molecular weight distribution of the prepolymer to be dispersed,
(vi) presence, type and amount of free-radical polymerizable monomers,
(vii) surfactants, solvents, plasticizers, coalescing aids, and their ratios,
(viii) temperature of the prepolymer and aqueous medium in which it is dispersed, and time of dispersion before chain extension,
(ix) reactor configuration and mixing regime,
(x) sequence of addition of raw materials, time and temperature at each stage of prepolymer.

The example compositions and methods disclosed herein provide a polyurethane polymer or a hybrid polyurethane in the form of particles in which a second polymer, which is derived from a polymerized ethylenically unsaturated monomer or monomers, is retained within the structure of the preformed polymer particles. In either case, the particles of the dispersion may be of similar size. For example, the particles forming the dispersion may have a mean particle size of up to 170 nm, and in one embodiment, up to 160 nm, or up to 150 nm, or up to 140 nm, or up to 100 nm. The polyurethane polymer or hybrid polyurethane particles can have a mean particle size of at least 1 nm or at least 10 nm, and in some embodiments, at least 40 nm.

Gloss

The composition is applied to a hard surface and dried. A wet film (prepared from a composition containing at least 13 wt. % polymer solids) is applied at a thickness of 50.8 μm and dried. The dried film may have a Δgloss measured at a 60 degree angle of at least 26 units. Δgloss can be measured by a hand-held colorimeter (BYK micro-TRI glossmeter), as the difference between average gloss of a hard surface before applying the composition and the average gloss after the composition has been applied to that surface and allowed to dry. The hard surface can be a ceramic tile having a gloss value of, for example about 25-35 units, when uncoated. Average gloss, in each case, can be the mean of three readings. Unless otherwise stated, all Δgloss values reported herein are determined by that method.

Alternatively, gloss can be measured after applying a 25.4 μm thickness of the wet composition (containing 28 wt. % polymer solids) to a standardized surface followed by drying. A suitable standardized surface includes Leneta white (or black) color cards. A suitable gloss determination method, using a 60 degree angle, can be employed to obtain gloss values. Measurements by this method on white Leneta cards are referred to as Leneta gloss values. In one embodiment the Leneta gloss value is at least 65 gloss units.

In the exemplary embodiment, the polyurethane polymer in the treatment composition is siloxane-free. By this it is meant that siloxanes (which for purposes of discussion includes any organic component with a silicon-oxygen link) is present in the polyurethane polymer at less than 0.001 wt. %, or less than 0.0001 wt. % of the polymer content of the composition.

The exemplary polyurethane or polyurethane-acrylic dispersion polymer is used to formulate a cleaning product that can be applied to multiple surfaces, provide shine and water resistance, and not render the surface slippery or tacky.

A. The Aqueous Anionic Polyurethane-Based Dispersion

In the following description, the components of an exemplary aqueous anionic polyurethane-based dispersion A will be described.

The exemplary aqueous anionic polyurethane-based dispersion A may be derived from:

A1. 10.0 to 100.0 wt. % of the polyurethane-based polymer,
A2. Including 0.0-10 wt. % of a non-reactive diluent N, which in some embodiments, may be incorporated into the polyurethane polymer particles, and
D1. water.

The components A1 and optionally A2 form a particulate dispersion when combined with the water component D1, the amount of water in the dispersion being, for example, 10-80.0 wt. %. As will be appreciated, D1 serves as a component of D in the composition formulation described above.

The polymer component A1 of the polyurethane-based dispersion A can include at least one of a polyurethane polymer A1a and a polyurethane-(meth)acrylic/vinyl aromatic hybrid polymer A1 b. The component A1a and A1b may, singly or in combination comprise the whole of component A1.

In the case of the hybrid polymer A1b, the polymer includes a polyurethane polymer component A1 bi, analogous to polyurethane polymer A1a, and a free-radical polymerized polymer component A1 bii formed from ethylenically unsaturated monomers, such as a polymer formed from a (meth)acrylate monomer and a vinyl aromatic monomer. For ease of description, component A1 bii will be described as an acrylic/styrenic component. The acrylic/styrenic component A1 bii may be present at from 0.001 wt. % to 70 wt. % of A1b, such as at least 0.01 wt. %, or at least 0.1 wt. %.

In the exemplary embodiment, the acrylic/styrenic component A1 bii is present in pores of the polyurethane polymer component A1 bi. Accordingly, in the exemplary embodiment, the acrylic/styrenic component A1 bii is prepared in the presence of the polyurethane dispersion. For example, the polyurethane polymer component A1 bi is formed first as a particulate dispersion and the acrylic/styrenic component A1 bii is formed within and/or introduced to the pores of the particles, resulting in little or no change to the mean particle size of the particles.

As will be appreciated, in forming the exemplary aqueous anionic polyurethane-based dispersion A, additional components may be employed, such as defoamers to control dispersion.

A1. Polyurethane-Based Polymer

The polyurethane anionic polymer A1a may be a condensation polymer which is the reaction product (excluding water present) of:

E. a polyester and/or polyether polyol,
F. a water dispersability enhancing monomer, such as a carboxylic acid-containing diol and/or a polyol having a pendent poly(alkylene oxide) side chain,
G. an organic polyisocyanate,
and optionally, one or more of:

H. a catalyst,

J. a low molecular weight polyol, serving as a prepolymer chain extender and/or hard segment, K. a neutralizing agent;

L. a dispersion chain extender and/or branching agent, such as a polyamine or trifunctional polyol; and M. a non-reactive diluent.

By way of example, the polyurethane polymer A1a may be the reaction product of:

E. 10-80 wt. % of the polyester and/or polyether polyol,

F1. 2-10 wt. % of the carboxylic acid-containing diol (first water dispersability enhancing monomer), F2. 0-9 wt. % of the polyol having a pendent poly(alkylene oxide) side chain (second water dispersability enhancing monomer), G. 10-80 wt. % of the organic polyisocyanate, J. 0-3 wt. % of the low molecular weight polyol, K. 0-10 wt. % of the neutralizer;

L. 0.0-7.0 wt. % of the dispersion chain extender, such as a chain extending polyamine, and M. 0-10% of the non-reactive diluent.

Optionally, the prepolymer is formed in the presence of a catalyst H in a catalytic amount.

The polyurethane polymer A1b may be the reaction product of:

A polyurethane polymer A1b(i) formed from components E, F, G, and optionally H, J, K and/or L, as for polyurethane polymer A1a, described above, and An acrylic/styrenic polymer A1b(ii) which may be a free-radical polymer formed in the presence of the polymer A1b(i), and may be the reaction product of a plurality of unsaturated monomers, such as:

N1. a (meth)acrylate monomer, and

N2. a vinyl aromatic hydrocarbon monomer, in the presence of

N3. an initiator, such as a free-radical initiator.

The acrylic/styrenic polymer formed in the hybrid polyurethane polymer A1b may be the reaction product of:

N1. 30-99.9 wt. % (or 30-70 wt. %) of (meth)acrylate monomer, and

N2. 0.10-70.0 wt. % (or 30-70 wt. %) vinyl aromatic hydrocarbon monomer, N1+N2 may contribute at least 90 wt. % or 100 wt. % of the units in the acrylic/styrenic polymer.

As an example, component N1 may include a plurality of monomers, such as a $C_1$-$C_{22}$ alkyl ester of methyl methacrylate and another (meth)acrylate monomer, such as n-butyl acrylate. In one embodiment, the total content of units in the solid polyurethane-acrylic/styrenic hybrid polymer that are derived from the $C_1$-$C_{22}$ alkyl ester of methyl methacrylate is no more than 32.0 wt. %.

The polyurethane dispersion A can be prepared by reacting at least one polyisocyanate G; at least one polyester or polyether polyol E, and at least one water-dispersability enhancing monomer F having water-dispersability enhancing groups, in order to form an isocyanate terminated prepolymer which includes units derived from the polyisocyanate, polyester/polyether polyol, and water-dispersability enhancing monomer. The prepolymer may subsequently be neutralized by reaction with at least one neutralizing agent K. At least one non-reactive diluent, such as a plasticizer/viscosity modifier, may be introduced into the reaction mixture at any time during prepolymer formation or before the prepolymer is dispersed in water. The prepolymer forming process can be conducted in the substantial absence or the complete absence of an organic solvent or a diluent other than a plasticizer. The prepolymer may then be dispersed in water, and then chain extended by reaction with at least one of water, an inorganic or organic polyamine L having an average of about 2 or more primary and/or secondary amine groups, or combinations thereof.

The chain-extended prepolymer compositions are referred to herein as polyurethanes because they contain urethane groups. It is well understood by those skilled in the art that "polyurethanes" is a generic term used to describe polymers obtained by reacting isocyanates with at least one hydroxyl-containing compound, amine containing-compound, or mixture thereof. Polyurethanes may also include allophanate, biuret, carbodiimide, oxazolidinyl, isocynaurate, uretdione, and other linkages in addition to urethane and urea linkages.

E. The Polyester and/or Polyether Polyol

The polyester and/or polyether polyol E can have a molecular weight of at least 200 g/mol. The molecular weight can be up to 4000 g/mol, or up to 3500 g/mol, or up to 3000 g/mol. In one embodiment, the molecular weight is at least 500 or at least 1000.

The polyester and/or polyether polyol E serves as a source of active hydrogen and can react with isocyanate groups in the polyisocyanate monomer G to form the polyester prepolymer via the following reaction:

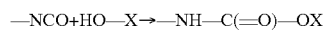

Polyols with number-average molecular weight from about 500 to 4,000 g/mol generally contribute to the soft segment of the polyurethane and the low molecular weight polyol J and dispersion chain extenders L, with molecular weights below about 500, typically contribute to the hard segment of polyurethane; however, the exact position of the divider is somewhat arbitrary and can be moved depending on the circumstances.

In one embodiment, the polyester polyol has a molecular weight of at least 300, or at least 400, or at least 800 g/mol. In one embodiment, the polyester polyol has a molecular weight of up to 4000, or up to 3500 or up to 3000, or up to 2000, or up to 1000. In one embodiment, the polyester polyol has a molecular weight of 800 to 1500, or 500 to 1000 g/mol. Polyester/polyether polyols with molecular weights below 200 can also serve as chain extenders for the prepolymer.

The polyester polyols may be esterification products prepared by the reaction of organic polycarboxylic acids or their anhydrides with a stoichiometric excess of a diol. Examples of suitable polyols for use in the reaction include polyglycol adipates, polyethylene terephthalate polyols, polycaprolactone polyols, orthophthalic polyols, sulfonated polyols, and the like, and mixtures thereof.

The diols used in making the polyester polyols can be aliphatic, cycloaliphatic or aromatic and include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, 2-butyl-2-ethyl propane-1,3-diol, polybutylene glycol, caprolactone diol, dimerate diol, hydroxylated bisphenols, polyether glycols, halogenated diols, and the like, and mixtures thereof. Exemplary diols include ethylene glycol, butylene glycol, hexane diol, and neopentyl glycol. Examples include Versatic™ alcohols produced from CARDURA™ E10P (Hexion).

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, tetrabromophthalic anhydride and acid, dimeric fatty acids such as oleic acid, and the like, and mixtures thereof. Exemplary polycarboxylic acids used in making the polyester polyols include aliphatic or aromatic dibasic acids.

In one embodiment, the polyester polyol is a diol. Exemplary polyester diols include hexane diol neopentyl glycol adipic acid polyester diol, e.g., Piothane™ 67-3000HNA, Piothane 67-1000HNA and Piothane™ 67-500HNA (Panolam Industries); as well as propylene glycol maleic anyhydride adipic acid polyester diols, e.g., Piothane 50-1000PMA; and hexane diol neopentyl glycol fumaric acid polyester diols, e.g., Piothane 67-500 HNF. Other exemplary polyester diols include Rucoflex™ S1015-35, S1040-35, and S-1040-110 (RUCO Polymer Corp.).

An exemplary polyester polyol is derived from 1,6-hexanediol, neopentyl glycol, and adipic acid. Particularly suitable are those having a molecular weight of 500 to 3000 g/mol, or from 500 to 2000, or from 500 to 1500 g/mol.

The polyester polyol(s) may be present, expressed on the dry weight of the polyurethane, in an amount of at least 10 wt. %, or at least 20 wt. %, or at least 30 wt. %, or at least 40 wt. %. They may be present at up to 80 wt. %, or up to 60 wt. % or up to 55 wt. %. When both a polyether and a polyester polyol are employed, these amounts may be reduced proportionately.

Polyether polyols, such as polyether diols may be substituted in whole or in part for the polyester diols. In one embodiment, the polyether polyol has a molecular weight of up to 4000, or up to 3500, or up to 3000, or up to 2000, or up to 1000 g/mol, such as at least 250, or at least 300 g/mol. For example, the number average molecular weight of the polyether diols used to form the polyurethane may be 250-1000 g/mol.

Polyether polyols can be obtained by reaction of starting compounds that contain reactive hydrogen atoms, such as water or the diols set forth for preparing the polyester polyols, with alkylene oxides, such as ethylene oxide, propylene oxide, butylene oxide, styrene oxide, tetrahydrofuran, epichlorohydrin, and mixtures thereof. Exemplary polyethers include polytetrahydrofuran (PTHF) and poly (propylene glycol) (PPG). Examples include Terathane™ PTHF polyols from Invista and Acclaim™ PPG diols with lower monol contents from Arco Chemical.

In one embodiment, the polyether polyol is polypropylene glycol or polytetramethylene glycol having molecular weight of at least 200, or at least 250 g/mol. The polyether polyols may be present, expressed on the dry weight of the polyurethane, in an amount of at least 10 wt. %, or at least 20 wt. %, or at least 40 wt. % and can be up to 80 wt. %, or up to 60 wt. %, or up to 55 wt. %. In one embodiment, it is present at 40 to 55 wt. %.

F. Water-Dispersability Enhancing Compound(s)

Since polyurethanes are generally hydrophobic and not water-dispersible, at least one water-dispersability enhancing compound is included in the exemplary polyurethane polymers and prepolymers to assist dispersion of the polymer/prepolymer in water.

In general, the water-dispersability enhancing compound bears at least one hydrophilic group or a group that can be made hydrophilic (e.g., by chemical modifications such as salt formation) into the polymer/prepolymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number of at least 10 mgKOH/g, or at least 12, or at least 14, or at least 16 mgKOH/g. The acid number may be up to 200 mgKOH/g, or up to 130, or up to 60, or up to 40 mgKOH/g.

The exemplary polyurethane includes at least one unit derived from a water-dispersability enhancing compound (i.e., monomer) F1 which has at least one hydrophilic, ionic or potentially ionic/hydrophilic group. In the exemplary polyurethanes, the monomer F1 may include a carboxylic acid-containing diol.

Exemplary carboxylic acid-containing diols useful herein include hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include 2,2-bis-dimethylolpropionic acid, dimethylol butanoic acid, citric acid, tartaric acid, glycolic acid, lactic acid, malic acid, dihydroxymalic acid, and the like, and mixtures thereof. Dihydroxy-carboxylic acids are exemplary, with 2,2-bis-dimethylolpropionic acid and dimethylol butanoic acid being specific examples.

The exemplary carboxylic acid-containing diol F1 may have a molecular weight of up to 200 g/mol. In one specific embodiment, the carboxylic acid-containing diol is 2,2-bis (methylol)propionic acid, and the acid is partially or fully neutralized.

Other water-dispersability enhancing compounds F2 can also be reacted into the prepolymer backbone and including lateral or terminal hydrophilic ethylene oxide or ureido units. Water-dispersability enhancing compounds of the nonionic type of particular interest are side chain hydrophilic monomers.

Polyols having poly(alkylene oxide) side-chains which can be incorporated into the exemplary polyurethane and can serve as water dispersability enhancing agents may have side-chains with repeat units of poly(alkylene oxide) (e.g. from about 5 to about 50, or from about 15 or about 20 to about 30 or about 40). The number average molecular weight of the side-chain containing alkylene oxide monomers is generally from about 350 to about 5,000, or from about 750 to about 2,000. Examples are described in U.S. Pat. No. 3,905,929. Further, U.S. Pat. No. 5,700,867 teaches methods for incorporation of poly(ethylene oxide) side-chains. Other examples include alkylene oxide polymers and copolymers in which the alkylene oxide groups have from 2-10 carbon atoms as shown, for example, in U.S. Pat. No. 6,897,281.

An exemplary polyol having poly(ethylene oxide) (PEO) side-chains is trimethylol propane monoethoxylate methyl ether, available as Tegomer D-3403 from Degussa-Goldschmidt or Ymer™ N120 from Perstop. Tegomer D-3403 and Ymer N120 generally have an average side chain degree of polymerization of about 23 to about 26 ethylene oxide repeat units.

In the case of the nonionic type of dispersability enhancing additive (e.g., polyalkylene oxide) and oligomers thereof, these may be present at up to 10 wt. %, or up to 5 wt. %, or up to 3.5 wt. % of the polyurethane polymer.

G. Polyisocyanate

Suitable polyisocyanates have an average of about two or more isocyanate groups, such as an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are exemplary. Monofunctional isocyanates can also be used in the formulation, for example, as molecular-weight controlling agents.

Specific examples of suitable aliphatic polyisocyanates include alpha, omega-alkylene diisocyanates having from 5 to 20 carbon atoms, such as hexamethylene-1,6-diisocyanate (HDI), 1,12-dodecane diisocyanate (C12DDI), 2,2,4-trimethyl-hexamethylene diisocyanate, 2,4,4-trimethyl-hexamethylene diisocyanate, 2-methyl-1,5-pentamethylene diisocyanate, lysine diisocyanate and the like. Polyisocyanates having fewer than 5 carbon atoms can be used but may be unsuited to some applications because of their high volatility and toxicity. Exemplary aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate (commercially available as Desmodur™ W from Bayer Corporation), isophorone diisocyanate, 1,4-cyclohexane diisocyanate, 1,3-bis-(isocyanatomethyl) cyclohexane, methylcyclohexane diisocyanate, cyclohexane triisocyanate, their isomers and the like. Exemplary cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. An exemplary araliphatic polyisocyanate is tetramethyl xylylene diisocyanate.

Examples of suitable aromatic polyisocyanates include diphenylmethylene diisocyanate, toluene diisocyanate, phenylene diisocyanate, naphthalene diisocyanate, tetrahydronaphthalene diisocyanate, biphenylene diisocyanate, dimethyl biphenylene diisocyanate, dichloro biphenylene diisocyanate, triphenyl methane triisocyanate, their isomers, and the like. Exemplary aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Dimers, trimers, and oligomers of the above mentioned isocyanates may also be used. Examples include polymeric MDI.

Isocyanates can be used alone or in combination of two or more.

In one embodiment, the isocyanate includes dicyclohexylmethane diisocyanate.

In the exemplary embodiment the polyester/polyether prepolymer produced is generally isocyanate-terminated. For this purpose, the ratio of isocyanate equivalents to active hydrogen in the prepolymer (NCO:OH Ratio) can range from about 1.3/1 to about 2.5/1, such as from about 1.5/1 to about 2.1/1, and in one embodiment, from about 1.7/1 to about 2/1.

An OH-terminated prepolymer can also be made if desired. In this case, an excess of OH equivalents over NCO is used.

H. Catalyst

The formation of the isocyanate-terminated prepolymer may be achieved without the use of a catalyst. However, a catalyst may be used in some instances. Examples of suitable catalysts include stannous octoate, dibutyl tin dilaurate, and tertiary amine compounds such as triethylamine and bis-(dimethylaminoethyl) ether, morpholine compounds such as β,β'-dimorpholinodiethyl ether, bismuth carboxylates, zinc bismuth carboxylates, iron (III) chloride, potassium octoate, potassium acetate, and DABCO™ (bicycloamine) from Air Products. A suitable catalyst is FASCAT™ 2003 from Elf Atochem North America. The amount of catalyst used is typically from about 5 to about 200 parts per million of the total weight of prepolymer reactants.

J. Low Molecular Weight Polyol (Prepolymer Chain Extender)

Because the prepolymer is formed at elevated temperatures and in the general absence of water, the alcohol functionality is generally suitable for the prepolymer chain extension to provide for better control over the temperature and mixing. Any low-molecular-weight (less than 500 g/mol) polyols may be used as the prepolymer chain extenders. The low molelcular weight polyol, which is different from the polyether and/or polyester polyol, may have a molecular weight of less than 300 g/mol, such as less than 200 g/mol. Exemplary prepolymer chain extenders include diol monomers. Polyalcohols with more than two hydroxyl groups can also be used. Example low molecular weight polyols include monomeric polyols having an average of two hydroxyl or other NCO-reactive groups per molecule.

Examples of suitable monomeric polyols useful as prepolymer chain extenders include those having from 2 to 12 carbon atoms, such as from 2 to 8 carbon atoms, such as 1,2-ethanediol (ethylene glycol), diethylene glycol, 1,2-propanediol (or 1,2-propylene glycol), 1,3-propanediol (or 1,3-propylene glycol), butanediols, such as 1,4-butanediol (or 1,4-butylene glycol), hexanediol, such as 1,6-hexanediol (or 1,6-hexamethylene glycol), 2-methyl-1,3-propanediol, 2,2-dimethyl-1,3-propanediol (or neopentyl glycol), 1,4-bis(hydroxymethyl)cyclohexane (or cyclo-hexanedimethanol), mixtures thereof, and the like, as well as halogenated diols such as dibromoneopentyl glycol, and mixtures thereof.

Such polyols can be incorporated at from 0.1 to 10 wt. % of the total polyurethane polymer components, and in some embodiments, up to 4 wt. %.

In one embodiment, the low molecular weight polyol J is 1,4-butanediol. It may be present in the polyurethane polymer at a concentration of 0 to 3.0 wt. %, such as at least 0.1 wt. %, or at least 0.2 wt. %. In some embodiments the 1,4-butanediol is present in the polyurethane polymer at up to 2.0 wt. %, or up to 0.5 wt. %.

In some embodiments, a ratio of low molecular weight polyol J:polyester/polyether polyol(s) E is in the range of 0.002:1 to 0.04:1.

The low molecular weight polyols can help to enhance rigidity and strength of the polyurethane polymer.

In another exemplary embodiment, no prepolymer chain extender is used.

K. Prepolymer Neutralization Agent

Optional neutralization of the prepolymer converts the carboxyl groups to carboxylate anions, thus having a water-dispersability enhancing effect. Suitable neutralizing agents include tertiary amines, metal hydroxides, ammonium hydroxide, phosphines, and other agents well known to those skilled in the art. Tertiary amines are exemplary and include triethyl amine (TEA), as well as dimethyl ethanolamine (DMEA), N-methyl morpholine, and mixtures thereof. It is recognized that primary or secondary amines may be used in place of tertiary amines, if they are sufficiently hindered to avoid interfering with the chain extension process.

The neutralizing agent may be employed, expressed as a ratio of moles of neutralizer:moles of carboxyl groups in the polyurethane, at from 0.001 to 1:1 (or in excess), such as at least 0.01:1, or at least 0.1:1, or at least 0.2:1.

L. Dispersion Chain Extenders/Branching Agents

In general, dispersion chain extenders L1 have two reactive groups while branching and cross linking agents L2 have at least three reactive groups. As will be appreciated, branching agents also serve as chain extenders.

Chain extenders used in the formation of the prepolymer are referred to herein as prepolymer chain extenders J, and are discussed above. Those used for chain extension of the polyurethane polymer during or after the dispersion of the prepolymer in water are referred to herein as dispersion chain extenders. Dispersion chain extenders can have a molecular weight from 18 to 500 g/mol.

During the dispersion stage of the process, dispersion chain extenders are competing with water for the reaction with the remaining NCO. In this case, the more reactive amine functionality is generally suitable. As a dispersion chain extender, at least one of water, an inorganic or organic polyamine having an average of about 2 or more primary and/or secondary amine groups, or combinations thereof, is suitable for use herein. Exemplary dispersion chain extenders include polyamines of molecular weight of up to 500 g/mol, up to 300 g/mol, or up to 200 g/mol.

Suitable organic amines for use as a dispersion chain extender include diamines and polyamines. Exemplary amine dispersion chain extenders include ethylene diamine (EDA), diethylene triamine (DETA), triethylene tetramine (TETA), meta-xylylenediamine (MXDA), aminoethyl ethanolamine (AEEA), 2-methyl pentane diamine, and the like, and mixtures thereof. Also suitable are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof.

Suitable inorganic amines include hydrazine, substituted hydrazines, and hydrazine reaction products, and the like, and mixtures thereof. Ammonia (NH$_3$), if used as a neutralizer during the dispersion step, can also contribute to the consumption of the remaining NCO during the dispersion stage with the formation of terminal urea.

An exemplary dispersion chain extender is ethylenediamine.

The amount of dispersion chain extenders can range from about 0.3 to about 1.1 equivalents, or 0.5 to about 0.95 equivalents, based on available isocyanate.

L2: Branching agents: Compounds having at least one crosslinkable functional group can also be incorporated into the exemplary polyurethane, if desired, to aid branching/crosslinking. Branching of the ultimate polymer product, as well as the prepolymer, can be accomplished by addition of monomeric or polymeric polyols having more than two hydroxyl or other NCO-reactive groups per molecule. Branching generally leads to improved tensile strength, water and chemical resistance.

Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslinkability include thioglycolic acid, 2,6-dihydroxybenzoic acid, melamine and its derivatives, multivalent metal compounds, aziridines, carbodiimides, and the like, and mixtures thereof. Other suitable materials include monomeric and polymeric trifunctional polyols.

Examples of these include low molecular weight trifunctional polyols such as polypropylene triols, such as trimethylolpropane and polypropylene glycol triol, as well as glycerol, hexane-1,2,6-triol, butane-1,2,4-triol, trimethylolethane, pentaerythritol, quinitol, mannitol sorbitol, methyl glycoside, mixtures thereof, and the like.

Branching monomers that can be used in the dispersion phase include low molecular weight polyamines such as diethylene triamine (DETA) and triethylene tetramine (TETA) and higher molecular weight polymeric trifunctional polyols, such as polypropylene oxide-based triol. Multranol 4012 from Bayer Corp. for example, is a polypropylene oxide-based triol of molecular weight of 450 available from Bayer Corporation.

The amount of optional compounds having crosslinkable functional groups in the prepolymer can be up to about 0.001 wt. % of the polyurethane on a dry weight basis, or from 0.00005 to 0.0005 wt. %, or from 0.0001 to 0.0003 wt. %.

M. The Prepolymer Diluent

The polyurethane may be prepared in the presence of a non-reactive diluent M in order to render the viscosity of the polyurethane prepolymer low enough to process it. The non-reactive diluent can be added at any time during prepolymer preparation or before the prepolymer is dispersed in water, e.g., separately or as a mixture with one or more reaction components prior to prepolymer preparation.

The polyurethane dispersion may include 0.01-20.0 wt. %, or up to 10 wt. %, or up to 5 wt. %, or about 0 wt. % of one or more such non-reactive diluents, one or more of which may also serve as a plasticizer.

The plasticizer can be used substantially in place of, or completely in place of other organic diluents, such as organic solvents. Further, solids content of the final product is increased, since the plasticizer remains in the final product and does not require a burdensome product purification process. Moreover, intimate mixing of the plasticizer occurs, thereby avoiding or reducing problems that can occur with plasticizer addition any time after the prepolymer is dispersed in water, such as stratification and bleeding. (Stratification and bleeding can occur when a plasticizer is added following prepolymer dispersion in water; the plasticizer typically is not well mixed and separates from the composition.) Moreover, addition of plasticizer during prepolymer formation or before prepolymer dispersion in water enhances polyurethane film formation during subsequent processing since the intimately mixed plasticizer allows easier coalescence. Moisture resistance of the exemplary polyurethanes also is enhanced, since the intimately mixed plasticizer is hydrophobic and tends to slow hydrolysis, especially of polyester-based polyurethanes.

Plasticizers may be selected according to parameters such as compatibility with the particular polyurethane and desired properties of the final composition. For example, polyester plasticizers tend to be more compatible with polyester-based polyurethanes. Reactive plasticizers can be used that react with functionality of the ingredients. For example, epoxy groups may be present in reactive plasticizers that react with other compounds such as aminated and hydroxylated compounds respectively. Ethylenically unsaturated groups may be present in reactive plasticizers that react with compounds having ethylenic unsaturation. Plasticizers can also be selected to impart particular properties to the polyurethanes, or to enhance particular properties of the final composition.

Suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anyhydride, melissic acid, myristic acid, oleic acid, palmitic acid, phosphoric acid, phthalic acid, ricinoleic acid, sebacic acid, stearic acid, succinic acid, 1,2-benzenedicarboxylic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex™ esters from Kalama Chemical), polyethylene glycol dibenzoate, 2,2,4-trimethyl-1,3-pentanediol monoisobutyrate benzoate, 2,2,4-trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl ($C_7$/$C_9$) benzyl phthalate, dimethoxyethyl phthalate, 7-(2,6,6,8-tetramethyl-4-oxa-3-oxo-nonyl) benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% Cl, o,p-toluenesulfonamide, N-ethyl p-toluene sulfonamide, N-cyclohexyl p-toluene sulfonamide, sulfonamide-formaldehyde resin, and mixtures thereof. Other suitable plasticizers include castor oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Dibenzoate esters are of particular interest in home care applications as replacements for more hazardous components. Dibenzoate esters increase film flexibility and improve the dried film's resistance to moisture. An exemplary dibenzoate ester useful herein is benzyl benzoate.

Solvents, which are nonreactive to any significant extent in the context of the urethane-making reactions, may be used herein to reduce the prepolymer viscosity, provide a heat sink, serve as refluxing medium and assist with film formation. Examples of solvents include substituted pyrrolidinones, amides, esters, ethers, ketoesters, ketones, glycoletheresters, hydrogenated furans, tertiary alcohols, aromatic and aliphatic hydrocarbons, chlorinated hydrocarbons, and the like, and mixtures thereof.

Specific examples include N-methyl-2-pyrrolidone, N-ethyl-2-pyrrolidinone dimethylformamide, dimethylacetamide, acetone, methylethyl ketone, diisobutyl ketone, isobutylheptyl ketone, dimethylsulfoxide, N-methyl caprolactam, N-methyl valerolactam, ethylene glycol monomethyl ether formal, and dipropylene glycol dimethyl ether.

In some cases, the organic diluent M may be incorporated into the structure of the polymer particles, e.g., by hydrogen bonding or other weak links to the polyurethane polymer A1. A ratio of A1:M by weight may be, for example, from 10:1 to 1:100. In other embodiments, the prepolymer phase diluent M may be removed from the composition, for example, by evaporation.

A1 b. Polyurethane/Acrylic-Styrenic Hybrids

Mixtures of polyurethane dispersions and addition polymer dispersions derived from ethylenically unsaturated monomers can be used to provide certain properties, such as hardness, as well as reduced cost. Conventionally, polymer blends produced by mixing results in a physical blend containing particles of the addition copolymer, such as an acrylic polymer, and separate, polyurethane polymer particles. These can flocculate so becoming unstable and eventually unusable. The exemplary polyurethane-acrylic/styrenic hybrid dispersions avoid this problem by forming the acrylic/styrenic polymer within the preformed polyurethane particles. As an example, the hybrid polyurethane polymers disclosed herein may be prepared by polymerizing suitable unsaturated monomers in an aqueous dispersion for forming the acrylic/styrenic polymer by free radical polymerization in the presence of a polyurethane dispersion comprising polyurethane polymer particles, to form an acrylic/styrenic polymer within the polyurethane particles. The polyurethane portion of the hybrid composition can be prepared similarly to the waterborne polyurethane dispersion discussed above. For example, a water-dispersible polyurethane prepolymer carrying unreacted isocyanate groups is prepared as described above. This step is generally carried out in the absence of water. The molecular weight of the prepolymer is then increased by chain extension. This can be achieved by dispersing the prepolymer in water, using shear, and causing the isocyanate moieties to react with water or a chain extender to form a polyurethane dispersion. Addition-copolymerizable monomers are then added to the dispersion and caused to polymerize, resulting in a dispersion of polyurethane-acrylic/styrenic hybrid particles. The resulting polyurethane-polyurethane-acrylic/styrenic hybrid particles provides an interpenetrating polymer network of the polyurethane and polyacrylic-styrenic polymer with the more hydrophobic polyacrylic-styrenic acrylic residing preferentially within the shell of the waterborne particle. In one embodiment, the unsaturated monomers for forming the acrylic/styrenic portion are added to the urethane prepolymer before dispersion and chain extension. Optionally, additional free radical polymerizable material (unsaturated monomers) may be added to the already present unsaturated monomers in the prepolymer dispersion to copolymerize with the already present monomers in the same particle. In another embodiment, unsaturated monomers are added to the fully chain-extended polyurethane dispersion, followed by free radical polymerization. The weight ratio of polymers derived from unsaturated monomers to urethane polymers may be in the range of 10:90 to 90:10.

N. The Ethylenically-Unsaturated Copolymerizable monomers

The monomers which can be used to form the polymer hybrid are monomers having at least one unsaturated ethylenic group and more particularly those which can polymerize with free radicals.

In the example embodiment, these include at least one of a vinyl aromatic monomer N2 and an ethylenically unsaturated monomer N1 having at least one group which is an ester, nitrile, or amide of a carboxylic acid. Of the various esters, nitriles, and amides, the esters of acrylic acid and methacrylic acid are exemplary.

The monomers N1, N2 may be mono-ethylenically unsaturated and/or polyunsaturated.

Exemplary monomers N1 include $C_1$-$C_{22}$ alkyl esters and α-μ-unsaturated mono- or polycarboxylic acids of acrylic acid, methacrylic acid, itaconic acid, crotonic acid, maleic acid, fumaric acid and vinylbenzoic acid, such as alkyl (meth)acrylates. Acrylic acid esters and methacrylic acid esters useful in preparing acrylic compositions include those having of formula (I):

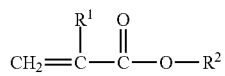

(I)

where $R^1$ is hydrogen or a methyl group, and $R^2$ contains 1 to 50 carbon atoms and optionally also one or more sulfur, nitrogen, halogen or oxygen atoms. For example, $R^2$ can be an ethyl or butyl group. Examples of suitable acrylate esters include methyl acrylate, ethyl acrylate, n-propyl acrylate, isopropyl acrylate, n-butyl acrylate, 2-ethylhexyl acrylate, and n-decyl acrylate. Examples of suitable methacrylate esters include methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl-(meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate, norbornyl (meth)acrylate, acrylamide and its derivatives, and tetrahydropyranyl (meth)acrylate. Mixtures of acrylic and methacrylic acid esters may be used. The polymerized acrylic and methacrylic acid esters typically may comprise from 0 or 0.1 wt. % to about 99 wt. %, or from 20 wt. % to about 95 wt. %, or from 50 wt. % to about 90 wt. %, of the acrylic\styrenic polymer dry weight.

Example monomers N1 include methyl methacrylate and butyl methacrylate.

Exemplary vinyl aromatic monomers N2 are styrenic monomers containing a carbon-carbon double bond in an alpha-position to an aromatic ring as described, for example, in U.S. Pat. No. 7,358,295. The styrenic monomers can be defined as monomers containing a carbon-carbon double bond in alpha-position to an aromatic ring. The styrenic monomers may be represented by the following formulae:

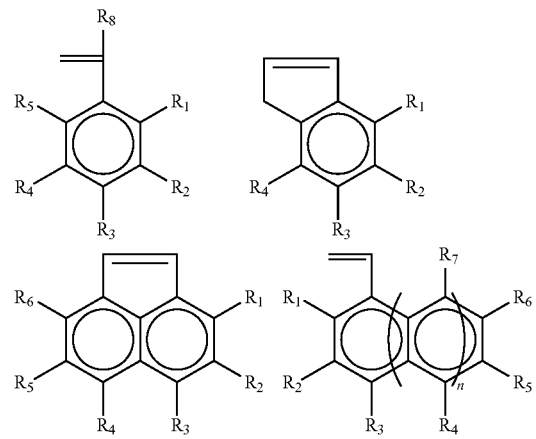

wherein n is an integer from 0 to 2; $R_1$, $R_2$, $R_3$, $R_4$, $R_5$, $R_6$, and $R_7$ are selected from the group consisting of H, $CH_3$, $C_mH_{2m+1}$, OH, $OCH_3$, $OC_mH_{2m+1}$, COOH, $COOCH_3$, $COOC_mH_{2m+1}$, Cl and Br, m is an integer from 2 to 9, and $R_8$ is selected from the group consisting of H, $CH_3$, $C_mH_{2m+1}$, and $C_6H_5$.

Examples of suitable styrenic monomers useful in preparing the acrylic compositions include styrene, alpha-methylstyrene, tertiary butylstyrene, ortho-, meta-, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinyl-naphthalene, vinyl (alkyl-naphthalenes) and vinyl (halonaphthalenes) and mixtures thereof, acenaphthylene, diphenylethylene, and vinyl anthracene. Mixtures of styrenic monomers also may be used. Styrene is exemplary. The polymerized styrenic monomers typically may comprise from 0 or 0.1 wt. % to about 99 wt. % or up to 80 wt. %, or up to 70 wt. %, or up to 40 wt. %, of the dry weight of the acrylic/styrenic polymer, such as at least 1 wt. %, or at least 2 wt. %, e.g., a least 5 wt. %.

In the exemplary acrylic/styrenic polymer, polyunsaturated monomers may be used as internal crosslinking agents and include (meth)acrylic esters having at least two non-conjugated unsaturated ethylenic double bonds, such as alkylene glycol di(meth)acrylates, for example, ethylene glycol di(meth)acrylate, 1,2-propylene glycol di(meth)acrylate, 1,3-propylene glycol di(meth)acrylate, 1,3-butylene glycol di(meth)acrylate, 1,4-butylene glycol diacrylate, and 1,6-hexanediol di(meth)acrylate. Other suitable polyunsaturated monomers include allyl(meth)acrylate, diallyl fumarate, triallyl cyanurate, divinylbenzene and vinyl (meth)acrylate.

Monomers which can be used as precursors of postpolymerization crosslin king (autocrosslinking or non-autocrosslinking) may be employed, such as diacetone acrylamide (DAAM), diacetone methacrylamide, 2-butanone (meth)acrylamide, vinyl acetoacetate and acetoacetoxyethyl(meth)acrylate, monomers having silane groups (silane monomers), such as vinyltrialkoxysilanes, for example, vinyl-trimethoxysilane, alkylvinyldialkoxysilanes, acryloyloxyalkyltrialkoxysilanes and methacryloyloxy-alkyltrialkoxysilanes, such as acryloyloxyethyltrimethoxysilane, methacyloxyethyltrimethoxysilane, acryloyloxypropyltrimethoxy-silane, and methacryloyloxypropyl trimethoxysilane.

Chain-transfer agents may be employed, such as linear or branched alkyl mercaptans and mercaptocarboxylic acids having from 2 to 8 carbon atoms, and their esters, such as mercaptoacetic acid, 2-mercaptopropionic acid, 3-mercaptopropionic acid, 2-mercaptobenzoic acid, mercaptosuccinic acid, mercaptoisophthalic acid, and their alkyl esters.

Exemplary chain-transfer agents are esters of a mercaptomonocarboxylic acid and/or of a mercaptodicarboxylic acid having from 2 to 6 carbon atoms, such as the alkyl esters of a mercaptopropionic acid, particularly the isooctyl or n-dodecyl esters of mercaptopropionic acid, or n-dodecyl mercaptan.

Exemplary acrylic/styrenic copolymers useful for formation of the hybrid polymer may include free radically polymerizable units that are selected from at least one monomer N1 which is a $C_1$-$C_{22}$ alkyl ester of (meth)acrylic acid and at least one styrenic monomer N2. Combinations of esters are contemplated, such as two or more monomers which are each an alkyl ester of (meth)acrylic acid as monomer N1. For example, the alkyl esters of (meth)acrylic acid may include methyl methacrylate and n-butyl methacrylate. As the styrenic monomer, styrene may be used. The amounts of the three monomers in the acrylic/styrenic copolymer may range from about 15 to 70 wt. % for each of the monomers.

The relative proportions of acrylic-styrenic copolymer and urethane polymer making up the particles can be varied. A minimum level of polyurethane is required to stabilize the hybrid particle. The ratio of acrylic-styrenic copolymer to the urethane polymer, calculated on a weight basis can be from 10:90 to 50:50, or from 10:90 to 30:70, or from 15:85 to 25:75.

To provide a high gloss at low coating weight, the exemplary hybrid polymers may utilize amounts of methyl methacrylate of up to 33 wt. % in the polymer hybrid, on a dry weight basis. Polymers containing a higher concentration of methyl methacrylate tend to be associated with lower improvements in gloss on hard substrates, which may be undesirable for some applications.

N3. The Initiator

The initiator can be any suitable free radical initiator. Suitable initiators can comprise at least one polymerization free radical. The amount of initiator can vary from 0.01 to 3% by weight, with respect to the total amount of monomers to be polymerized. The initiator can also be introduced with an activator as initial charge of the reaction medium and the remaining amount can be added continuously or batchwise during the polymerization.

Suitable initiators may have a halflife which is not less than 10 hours at 50° C., or not less than 10 hours at 85° C.

Example initiators include nonionic peroxides, such as organic peroxides, for example alkyl hydroperoxides, such as tert-butyl hydroperoxide (TBHP) and azo initiators, for example 2,2'-azobisisobutyronitrile and 2,2'-azobis[2-methyl-N-(2-hydroxyethyl)propionamide].

Exemplary activators include ascorbic acid, erythorbic acid or acetic sulfinic acid derivatives, such as sodium formaldehydesulfoxylate (Rongalite™ from Solvadis or Hydrosulfite™AWC from Cognis) and its compositions, such as Bruggolite™ FF6 from Bruggemann Chemical.

Polymer hybrids with good water resistance are suitably achieved when, during the acrylic polymerization phase, the ratio of the initiator (in parts per hundred of the polymerizable ethylenically unsaturated monomers, phm) to the concentration (in wt. %) of units derived from the ethylenically unsaturated monomers in the acrylic/styrenic-urethane hybrid (referred to herein as the I/A ratio) is less than 0.030, or up to 0.025, or up to 0.02, or up to 0.015, or up to 0.0125 or at least 0.01. When higher I/A ratios are used, this tends to produce films with poor water resistance, which may be unsuitable for some applications. For example, an I/A ratio of 0.01 can be achieved using 0.1 pph initiator (e.g., 0.01 g initiator and a total of 10 g of acrylate and styrene monomers) when the total weight % of acrylate and styrene-derived units in the acrylic/styrenic-urethane hybrid is 10%.

Example Dispersions A

Example polyurethane dispersions are as follows.

An exemplary polyurethane dispersion includes, based on the total weight of the dispersion, including water:

10-80 wt. % (or 20-55 wt. %, or 25-40 wt. %) of an anionic polyurethane polymer which is the reaction product of:

10-80 wt. % (or 20-65 wt. %, or 40-60 wt. %) of a polyester polyol or polyether polyol or combination thereof E, having a molecular weight of 200 to 4000 g/mol, e.g., a polyester polyol derived from 1,6-hexanediol, neopentyl glycol and adipic acid;

2-10 wt. % (or 2-6 wt. %, or 3-6 wt. %) of a carboxylic acid-containing diol F1, such as 2,2-bis(methylol)propionic acid, which may be partially neutralized;

0-9 wt. % (or 0-6 wt. %, or 0-4 wt. %, or at least 0.001 wt. %) of a polyol having a pendent poly(alkylene oxide) side chain F2;

0-10 wt. % (or 0.01-10 wt. %, or 0.1-1 wt. %) of a low molecular weight polyol J having a molecular weight less than 300 g/mol, such as 1,4 butanediol;

0-3 wt. % of a prepolymer neutralizing agent K, such as a tertiary amine, e.g., triethylamine;

0-7 wt. % (or 2-6 wt. %, or 2-5 wt. %) of a dispersion chain extender, such as a polyamine L1, e.g., ethylenediamine;

0-3 wt. % (or 0-2 wt. %, or at least 0.01 wt. %) of a branching agent L2, such as a trifunctional polyol, e.g., trimethylolpropane and/or polypropylene glycol triol; and 10-80 wt. % (or 20-60 wt. %, or 35-50 wt. %) of a polyisocyanate G, such as dicyclohexylmethane diisocyanate; and 0-10 wt. % (or 0.1-10 wt. %, or 2-8 wt. %, or 2-6 wt. %) of a non-reactive diluent M, such as benzyl benzoate.

The exemplary polyurethane dispersion further includes 0.1-80 wt. % (or 10-80 wt. %) of water D1, e.g., as the balance.

In the case where the polyester/polyether polyol component is 40 wt. % of the dispersion and has a molecular weight of about 3000 g/mol or greater, the polyol components J and K that have a molecular weight of less than 100, which are used for providing a hard segment component to the polyurethane and providing chain extension and cross linking, may be limited to a total of 1 wt. %, or less than 0.8 wt. %, or less than 0.6 wt. %, or less than 0.5 wt. % of the components which are incorporated into the polyurethane polymer A1.

An exemplary polyurethane hybrid dispersion includes:

10-80 wt. % (or at least 15 wt. %, or at least 20 wt. %, or at least 25 wt. %, or up to 55 wt. %, or up to 40 wt. %, or up to 35 wt. %) of a condensation polymer which is the reaction product of:

10-80 wt. % (or 20-55 wt. %, or 25-40 wt. %) an anionic polyurethane polymer as described above; and 0.001-20 wt. % (or 2-15 wt. %, or 3-8 wt. %) of a free-radical polymerization acrylic/styrenic polymer which is a reaction product of:

30-90 wt. % (or 30-70 wt. %, or 30-40 wt. %, or 30-33 wt. %) of at least one $C_1$-$C_{22}$ alkyl ester of (meth)acrylic acid, such as at least one $C_1$-$C_6$ alkyl ester of (meth) acrylic acid, such as a mixture of n-butyl acrylate and methyl methacrylate, e.g., in a ratio of 1:2 to 2:1, such as about 1:1;

10-70 wt. % (or 30-70 wt. %, or 60-70 wt. %) of at least one styrenic monomer, such as styrene; and 0.01-3 wt. % of initiator to start the free radical polymerization, e.g., at least 0.001 parts per hundred ethylenically unsaturated monomer(s), such as tert-butyl hydroperoxide.

The exemplary polyurethane hybrid dispersion further includes:

0.1-80 wt. % (or 10-80 wt. %) of water D1, e.g., as the balance. A ratio of anionic polyurethane polymer:acrylic/styrenic polymer may be 3000:1 to 1:1.

B. The Detersive Surfactant

The exemplary hard surface cleaning compositions contain one or more detersive surfactants. A detersive surfactant, as used herein, means a surfactant with cleaning power. As will be appreciated, the detersive surfactant may have other properties, however, it is incorporated primarily for its cleaning power, since the treatment composition is a particulate dispersion, rather than an emulsion. The detersive surfactant may be combined with the polyurethane dispersion after formation of the particles.

The detersive surfactant may be selected from nonionic detersive surfactants, anionic detersive surfactants, cationic detersive surfactants, quaternary surfactants, zwitterionic detersive surfactants, amine oxide detersive surfactants, and mixtures thereof. The exemplary composition may include a total of at least 0.001%, or at least 0.01% or at least 0.1% or at least 0.5% by weight of at least one detersive surfactant, such as up to 50%, or up to 30%, or up to 15%, or up to 5%, of one or more detersive surfactant components.

Exemplary anionic surfactants include $C_{11}$-$C_{18}$ alkyl benzene sulfonates, primary, branched-chain and random $C_{10}$-$C_{20}$ alkyl sulfates, such as $C_{10}$-$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are independently integers of at least 7, or at least 9, and M is a water-solubilizing cation, such as sodium, unsaturated sulfates, such as oleyl sulfate, $C_{10}$-$C_{18}$ alkyl alkoxy sulfates, such as EO 1-7 ethoxy sulfates, $C_{10}$-$C_{18}$ alkyl alkoxy carboxylates, such as EO 1-5 ethoxycarboxylates, $C_{10}$-$C_{18}$ glycerol ethers, $C_{10}$-$C_{18}$ alkyl polyglycosides and corresponding sulfated polyglycosides, $C_{10}$-$C_{20}$ alpha-sulfonated fatty acid esters, and mixtures thereof.

Exemplary anionic surfactants useful herein are disclosed in U.S. Pat. No. 4,285,841, issued Aug. 25, 1981, to Barrat et al., and in U.S. Pat. No. 3,919,678, issued Dec. 30, 1975 to Laughlin, et al.

Useful anionic surfactants include the water-soluble salts, particularly the alkali metal, ammonium and alkylolammonium (e.g., monoethanolammonium or triethanolammonium) salts, of organic sulfuric reaction products having in their molecular structure an alkyl group containing from about 10 to about 20 carbon atoms and a sulfonic acid or sulfuric acid ester group. (Included in the term "alkyl" is the alkyl portion of aryl groups.) Examples of this group of synthetic surfactants include alkyl sulfates, especially those obtained by sulfating the higher alcohols ($C_8$-$C_{18}$ carbon atoms) such as those produced by reducing the glycerides of tallow or coconut oil.

Other anionic surfactants herein are the water-soluble salts of alkyl phenol ethylene oxide ether sulfates containing from about 1 to about 4 units of ethylene oxide per molecule and from about 8 to about 12 carbon atoms in the alkyl group.

Other useful anionic surfactants herein include the water-soluble salts of esters of α-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and β-alkyloxy alkane sulfonates containing from about 1 to 3 carbon atoms in the alkyl group and from about 8 to 20 carbon atoms in the alkane moiety.

Useful anionic detersive surfactants include alkyl polyethoxylate sulfates of the formula $RO(C_2H_4O)_xSO_3^-M^+$ where R is an alkyl chain having from about 10 to about 22 carbon atoms, which may be saturated or unsaturated, M is a cation which makes the compound water-soluble, especially an alkali metal, ammonium or substituted ammonium cation, and x averages from about 1 to about 15.

Useful alkyl sulfate surfactants include non-ethoxylated $C_{12}$-$C_{15}$ primary and secondary alkyl sulfates. For room temperature applications (18-25° C., a mixture of such ethoxylated and non-ethoxylated alkyl sulfates may suitably be employed.

Nonionic and amphoteric surfactants include $C_{12}$-$C_{18}$ alkyl ethoxylates (AE) including the so-called narrow peaked alkyl ethoxylates and $C_6$-$C_{12}$ alkyl phenol alkoxylates (especially ethoxylates and mixed ethoxy/propoxy). $C_{10}$-$C_{18}$ N-alkyl polyhydroxy fatty acid amides can also be used. Examples of fatty acids include capric, lauric, myristic, palmitic, stearic, arachidic, and behenic acid. Other fatty acids include palmitoleic, oleic, linoleic, linolenic, and ricinoleic acid. Examples include $C_{12}$-$C_{18}$ N-methylglucamides. See, for example, those listed in WO 92/06154. Other sugar-derived surfactants include N-alkoxy polyhydroxy fatty acid amides, such as $C_{10}$-$C_{18}$ N-(3-methoxypropyl) glucamide. The N-propyl through N-hexyl $C_{12}$-$C_{18}$ glucam ides can be used for low sudsing. $C_{10}$-$C_{20}$ conventional soaps may also be used. If high sudsing is desired, branched-chain $C_{10}$-$C_{16}$ soaps may be used.

Examples of nonionic surfactants are described in U.S. Pat. No. 4,285,841 to Barrat, et al.

Specific examples of these surfactants include ethoxylated alcohols and ethoxylated alkyl phenols of the formula $R(OC_2H_4)_nOH$, where R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Examples of such surfactants are described in U.S. Pat. No. 4,284,532 to Leikhim, et al, issued Aug. 18, 1981. Ethoxylated alcohols having an average of from 10 to 15 carbon atoms in the alcohol and an average degree of ethoxylation of from about 6 to about 12 moles of ethylene oxide per mole of alcohol are exemplary. Mixtures of anionic and nonionic surfactants are especially useful.

Other useful surfactants include polyhydroxy fatty acid amides, alkyl glucosides, polyalkyl glucosides, $C_{12}$-$C_{18}$ betaines and sulfobetaines (sultaines).

Useful cationic surfactants include quaternary ammonium surfactants such as those of the formula: $[R^1R^2R^3R^4N]^+X^-$, where $R^1$ and $R^2$ are individually selected from the group consisting of $C_1$-$C_4$ alkyl, $C_1$-$C_4$ hydroxy alkyl, benzyl, and $-(C_2H_4O)_xH$ where x has a value of from 2 to 5; X is an anion; and (1) $R^3$ and $R^4$ are each a $C_6$-$C_{14}$ alkyl or (2) $R^3$ is a $C_6$-$C_{18}$ alkyl, and $R^4$ is selected from the group consisting of $C_1$-$C_{10}$ alkyl, $C_1$-$C_{10}$ hydroxyalkyl, benzyl, and —$(C_2H_4O)xH$ where x has a value of from 2 to 5.

Example quaternary ammonium surfactants include chloride, bromide, and methylsulfate salts. Examples of mono-long chain alkyl quaternary ammonium surfactants include those where $R^1$, $R^2$, and $R^4$ are each methyl and $R^3$ is a $C^8$-$C^{18}$ alkyl; or where $R^3$ is $C_{8-18}$ alkyl and $R^1$, $R^2$, and $R^4$ are selected from methyl and hydroxyalkyl moieties. Lauryl trimethyl ammonium chloride, myristyl trimethyl ammonium chloride, palmityl trimethyl ammonium chloride, coconut trimethylammonium chloride, coconut trimethylammonium methylsulfate, coconut dimethyl-monohydroxy-ethylammonium chloride, coconut dimethyl-monohydroxy-ethylammonium methylsulfate, steryl dimethyl-monohydroxy-ethylammonium chloride, steryl dimethyl-monohydroxyethylammonium methylsulfate, di-$C_{12}$-$C_{14}$ alkyl dimethyl ammonium chloride, and mixtures thereof are specific examples. Lauryl trimethyl ammonium chloride and myristyl trimethyl ammonium chloride are other examples.

Another group of suitable cationic surfactants includes alkanol amidal quaternary surfactants of the formula:

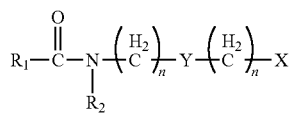

where $R_1$ can be $C_{10-18}$ alkyl or a substituted or unsubstituted phenyl; $R_2$ can be a $C_{1-4}$ alkyl, H, or (EO)y, where y is from about 1 to about 5; Y is O or —$N(R_3)(R_4)$; $R_3$ can be H, $C_{1-4}$ alkyl, or (EO)y, where y is from about 1 to about 5; $R_4$, if present, can be $C_{1-4}$ alkyl or (EO)y, where y is from about 1 to about 5; each n is independently selected from 1 to 6, or from about 2 to about 4; X is hydroxyl or —$N(R_5)(R_6)(R_7)$, where $R_5$, $R_6$, $R_7$ are independently selected from $C_{1-4}$ alkyl, H, or (EO)y, where y is from about 1 to about 5.

The compositions herein may also contain semi-polar nonionic amine oxide surfactants of the formula: $R^1(EO)_x(PO)_y(BO)_zN(O)(CH_2R^2)_2 \cdot qH_2O$ which includes one long-chain moiety $R^1(EO)_x(PO)_y(BO)_z$ and two short chain moieties, $CH_2R^2$, where $R^2$ is selected from hydrogen, methyl and —$CH_2OH$, $R^1$ is a primary or branched hydrocarbyl moiety which can be saturated or unsaturated, such as a primary alkyl moiety, x+y+z≥0, such as 0-10, and q≥0, such as 0-2; EO represents ethyleneoxy; PO represents propyleneoxy; and BO represents butyleneoxy. When x+y+z=0, $R^1$ may be a hydrocarbyl moiety having chain length of from 8 to 18. When x+y+z is different from 0, $R^1$ may be longer, such as a chain length in the range $C_{12}$-$C_{24}$. The general formula also encompasses amine oxides where x+y+z=0, $R^1$=$C_8$-$C_{18}$, $R^2$ is H and q is 0-2, such as 2. These amine oxides are illustrated by $C_{12-14}$ alkyldimethyl amine oxide, hexadecyl dimethylamine oxide, octadecylamine oxide and their hydrates, especially the dihydrates disclosed in U.S. Pat. Nos. 5,075,501 and 5,071,594. Amine oxides where x+y+z is from 1 to 10, $R^1$ is a primary alkyl group containing 8 to 24 carbons, such as from 12 to 16 carbon atoms; and where y+z may be 0 and x may be from 1 to 6, or from 2 to 4 are other examples. Such amine oxides can be prepared by conventional synthetic methods, e.g., by the reaction of alkylethoxysulfates with dimethylamine followed by oxidation of the ethoxylated amine with hydrogen peroxide.

Examples include dodecyldimethylamine oxide dihydrate, hexadecyldimethylamine oxide dihydrate, octadecyldimethylamine oxide dihydrate, hexadecyltris(ethyleneoxy)dimethyl-am ine oxide, tetradecyldimethylamine oxide dihydrate, and mixtures thereof.

When $R^2$ is other than H, examples include hexadecylbis(2-hydroxyethyl)amine oxide, tallowbis(2-hydroxyethyl)amine oxide, stearylbis(2-hydroxyethyl)amine oxide and oleylbis(2-hydroxyethyl)amine oxide.

Zwitterionic surfactants useful herein contain both basic and acidic groups which form an inner salt giving both cationic and anionic hydrophilic groups on the same molecule at a relatively wide range of pH's. Example cationic groups include quaternary ammonium groups, although other positively charged groups, such as phosphonium, imidazolium and sulfonium groups, can be used. Example anionic hydrophilic groups include carboxylates and sulfonates, although other groups, such as sulfates and phosphonates, can be used. Examples of zwitterionic surfactants include betaine/sulfobetaine surfactants described in U.S. Pat. Nos. 2,082,275, 2,702,279 and 2,255,082. Examples of particularly suitable alkyldimethyl betaines include coconut-dimethyl betaine, lauryl dimethyl betaine, decyl dimethyl betaine, 2-(N-decyl-N,N-dimethyl-ammonia)acetate, 2-(N-coco N,N-dimethylammonio) acetate, myristyl dimethyl betaine, palmityl dimethyl betaine, cetyl dimethyl betaine, stearyl dimethyl betaine. For example, coconut dimethyl betaine is commercially available from Seppic under the trade name Amonyl 265™. Lauryl betaine is commercially available from Sigma-Aldrich under the trade name Empigen BB/L™. Lauryl-immino-dipropionate is commercially available from Rhodia under the trade name Mirataine H2C-HA™.

Sulfobetaine surfactants are useful zwitterionic surfactants as they can deliver optimum soap scum cleaning benefits. Examples suitable sulfobetaine surfactants include tallow bis(hydroxyethyl) sulfobetaine, cocoamido propyl hydroxy sulfobetaines which are commercially available from Rhodia and Evonik Industries, under the trade names of Mirataine CBS™ and Rewoteric AM CAS 15™ respectively.

Other suitable detersive surfactants are disclosed in *McCutcheon's Detergents and Emulsifiers*, North American Edition (1986), Allured Publishing Corporation.

In addition to the above detersive surfactants, hydrotropes may be added to the composition to increase the solubilization of a relatively insoluble substance in the aqueous cleaning composition. These hydrotropes aid in solubilizing the organic and inorganic deposits which may accumulate on the hard surface, particularly in the case of shower stalls, bathtubs, and the like. Hydrotropes having a $C_6$-$C_{10}$ average length are exemplary of hydrotropes which may be employed in the present composition.

Examples of such hydrotropes include those described in WO/2000/023553.

C. Formulation Adjuvants

The exemplary treatment composition may optionally include one or more formulation adjuvants, such as builders, wetting agents, antifoaming agents, thickeners, pH adjusting agents, solvents (other than water), disinfectants and preservatives, colorants, chelating agents, and the like.

Builders: Builders suitable for use in the treatment compositions disclosed herein include polycarboxylates and phosphates. Polycarboxylate builders useful herein may include ether polycarboxylates, including oxydisuccinate, as disclosed in U.S. Pat. No. 3,128,287, issued Apr. 7, 1964, to Berg, and U.S. Pat. No. 3,635,830, issued Jan. 18, 1972, to Lamberti, et al. Others include TMS/TDS builders as disclosed in U.S. Pat. No. 4,663,071, issued May 5, 1987, to Bush, et al. Suitable ether polycarboxylates also include cyclic compounds, particularly alicyclic compounds, such as those described in U.S. Pat. Nos. 3,923,679; 3,835,163; 4,158,635; 4,120,874 and 4,102,903. Other useful builders include ether hydroxypolycarboxylates, copolymers of maleic anhydride with ethylene or vinyl methyl ether, 1,3, 5-trihydroxy benzene-2,4,6-trisulphonic acid, and carboxymethyloxysuccinic acid, the various alkali metal, ammonium and substituted ammonium salts of polyacetic acids such as ethylenediamineteracetic acid (EDTA) and nitrilotriacetic acid, as well as polycarboxylates, such as mellitic acid, succinic acid, oxydisuccinic acid, polymaleic acid, benzene 1,3,5-tricarboxylic acid, carboxymethyloxy-succinic acid, and soluble salts thereof. Citrate builders, e.g., citric acid and soluble salts thereof (particularly sodium salt), are polycarboxylate builders of particular importance due to their availability from renewable resources and their biodegradability. Oxydisuccinates are also examples. Suitable additional optional detergent builders include salts of ethylenediaminetetraacetic acid (EDTA), citric acid, nitroacetic acid, (NTA), sodium carboxymethylsuccinic acid, sodium N-(2-hydroxy-propyl)-iminodiacetic acid, and N-diethyleneglycol-N,N-diacetic acid (DIDA). The salts may be compatible and include ammonium, sodium, potassium and/or alkanolammonium salts. Exemplary detergent builders include mixtures citric acid/acetate and/or bicarbonate/carbonate, particularly bicarbonate/carbonate. The additional optional surfactant builders, when present, can be at levels of from 0.01% to 0.5%, or from 0.02% to 0.3%, or from 0.02% to 0.15%. The levels of these additional builders, present in the wash solution of hard surfaces that comprise glass should be less than 0.2%.

Wetting agents and Leveling aids: The cleaning composition may contain superwetting or leveling aids to form a good film of the polymer on the hard surface after cleaning. Exemplary superwetting agents are silicone based materials, e.g., ethoxylated silicone-based materials, such as ethoxylated trisiloxanes and ethoxylated carbosiloxanes. Examples of siloxanes include those available from Momentive under the Silwet™ tradename, from Dow Corning, such as Q2-5211 Superwetting Agent. The superwetting and leveling aid may also be based on hydrocarbon materials, such as sulfosuccinates, e.g., those available from Dow Chemical under the Triton™ GR-5M trade name.

Antifoaming agents: The treatment composition may contain antifoaming agents, such as one or more of hydrophobic silica, silicone oils, and hydrocarbons. Exemplary antifoaming agents are those available from Dow Corning under the Xiameter™ name and from Momentive under the Sagtex™ trade name.

Thickeners: The cleaning composition may contain rheology modifiers or thickeners necessary to give the composition a desired viscosity. Examples of useful thickeners are Novethix™ L-10 from Lubrizol, those sold under the Rheolate™ trade name by Elementis and Aquaflow™ from Hercules.

Chelating agents: The hard surface treatment compositions herein may also optionally contain one or more transition metal chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates. Amino carboxylates useful as optional chelating agents include ethylenediami inetetracetates, N-hydroxyethylethyl-ened iaminetriacetates, nitrilotriacetates, ethylenediamine tetraproprionates, triethylenetetraaminehexacetates, diethylene-triaminepentaacetates, and ethanoldiglycines, alkali metal, ammonium, and substituted ammonium salts therein and mixtures therein. An exemplary biodegradable chelator for use herein is ethylenediamine disuccinate (EDDS), especially the [S,S] isomer as described in U.S. Pat. No. 4,704, 233, issued Nov. 3, 1987, to Hartman, et al. If utilized, these chelating agents will generally comprise from 0.1% to 10%, or 0.1% to 3.0%, by weight of the treatment composition.

Perfumes: Perfumes are an important ingredient for hard surface cleaners, especially those that are used to "refresh" as they clean. Perfume is usually used at levels of from 0% to 2%.

Colorants: Optionally, dyes may be included in the treatment composition at levels of from 0.001% to 0.5%. Examples of suitable dyes are Alizarine Light Blue B (C.I. 63010), Carta Blue VP (C.I. 24401), Acid Green 2G (C.I. 42085), Astrogen Green D (C.I.42040), Supranol Cyanine 7B (C.I. 42675, Maxilon Blue 3RL (C.I. Basic Blue 80), Drimarine Blue Z-RL (C.I. ReactiveBlue 18), Alizarine Light Blue H-RL (C.I. Acid Blue 182), FD&C Blue No. 1 and FD&C Green No. 3. (See U.S. Pat. No. 4,248,827, issued Feb. 3, 1981, and U.S. Pat. No. 4,200,606, issued Apr. 29, 1980, both to Kitko) C.I. refers to Color Index.

Polymeric Dispersing Agents: Polymeric dispersing agents can be utilized in the treatment composition at levels from 0.1% to 7%, by weight, in the compositions herein. Suitable polymeric dispersing agents include polymeric polycarboxylates, polystyrene sulfonates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition. Polymeric polycarboxylate materials can be prepared by polymerizing or copolymerizing suitable unsaturated monomers, such as in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than 40% by weight. Particularly suitable polymeric polycarboxylates can be derived from acrylic acid. Such acrylic acid-based polymers which are useful herein are the water-soluble salts of polymerized acrylic acid. The average molecular weight of such polymers in the acid form may range from 2,000 to 10,000, or from 4,000 to 7,000, or from 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a component of the dispersing/anti-redeposition agent. Such materials include the water-soluble salts of copolymers of acrylic acid and maleic acid. The average molecular weight of such copolymers in the acid form may range from 2,000 to 100,000, or from 5,000 to 75,000, or from 7,000 to 65,000. The ratio of acrylate to maleate segments in such copolymers will generally range from 30:1 to 1:1, or from 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No.66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antiredeposition agent. Typical molecular weight ranges for these purposes range from 500 to 100,000, or from 1,000 to 50,000, or from 1,500 to 10,000.

Polyaspartate and polyglutamate dispersing agents may also be used. Dispersing agents such as polyaspartate may have a molecular weight (avg.) of 8000-15,000, such as about 10,000.

Bleach: The exemplary treatment compositions may optionally include a bleach. The bleach may be selected from the group consisting of sources of active oxygen, hypohalite bleaches, and mixtures thereof. The exemplary bleach acts as an oxidizing agent, thereby increasing the ability of the compositions to remove colored stains and organic stains in general, to destroy malodorous molecules and to kill germs.

Suitable sources of active oxygen for use herein include water-soluble sources of hydrogen peroxide. As used herein, a hydrogen peroxide source refers to any compound that produces hydrogen peroxide when the compound is in contact with water. Examples include hydrogen peroxide itself, mono- and dipersulfates, persulfuric acid, percarbonates, metal peroxides, perborates, persilicate salts, and mixtures thereof, organic or inorganic peracids, such as peroxyacids such as diperoxydodecanoic acid (DPDA) and phthaloyl amino peroxycaproic acid (PAP); magnesium perphthalic acid; perlauric acid; perbenzoic and alkylperbenzoic acids; and mixtures thereof. In addition, other classes of peroxides can be used as an alternative to hydrogen peroxide and sources thereof or in combination with hydrogen peroxide and sources thereof. Suitable classes include dialkylperoxides, diacylperoxides, preformed percarboxylic acids, organic and inorganic peroxides and/or hydroperoxides. Suitable hydroperoxides for use herein are selected from the group consisting of tert-butyl hydroperoxide, cumyl hydroperoxide, 2,4,4-trimethylpentyl-2-hydroperoxide, di-isopropylbenzene-monohydroperoxide, tert-amyl hydroperoxide and 2,5-dimethyl-hexane-2,5-dihydroperoxide and mixtures thereof. Such hydroperoxides have the advantage to be particularly safe to carpets and carpet dyes while delivering excellent bleaching performance.Persulfate salts, such as monopersulfate triple salts, or mixtures thereof, are exemplary sources of active oxygen to be used in the treatment compositions described herein. A potassium monopersulfate salt is commercially available from Peroxide Chemie GMBH under the trade name Curox™. Other persulfate salts, such as dipersulfate salts, are also available from Peroxide Chemie GMBH.

The treatment composition may include from 0% to 30%, or from 0.1% to 30%, or from 0.1% to 20%, or from 1% to 10%, or from 1% to 7%, by weight of the total composition of the bleach.

Preservatives and Disinfectants: The exemplary treatment composition may contain one or more preservatives to present microbes from growing during long term storage and use. At higher concentrations, these may serve as disinfectants to reduce the concentration of microorganisms on the hard surface that is being treated with the treatment composition.

Exemplary preservatives and disinfectants may include one or more of alcohols, e.g., $C_1$-$C_6$ alcohols such as ethanol and isopropanol, hydrogen peroxide, hydroxy acetic acid, perhydroxyacetic acid, peroxyacetic acids, phenols, triclosan, and chlorhexidine gluconate, biguanide, chlorophenol, paraben, zinc compounds, glutaraldehyde, and formaldehyde. Suitable peroxy acetic acids include peracetic acid and performic acid. Since some of these ingredients also serve as bleaches, for purposes of further description, they will be considered as such.

UV absorbers: The exemplary treatment composition may optionally contain UV absorbers to protect the treated surface from exposure to UV rays.

D. Diluents

Diluents make up the balance of the treatment composition and may be present at from 1-99 wt. %, in total, of the treatment composition, or at least 10 wt. %, or at least 20 wt. % or at least 50 wt. %, depending in part on whether the composition is to be diluted and/or whether the treatment composition is to be used for floor cleaning, polishing furniture, or the like. The diluent component includes at least some water and optionally one or more organic solvents added to the dispersion, i.e., in addition to the non-reactive diluents used in the prepolymer forming stage which are integrated into the polymer particles.

D1. Water

Water may make up the balance of the composition and may be present at a concentration of at least 1 wt. %, or at least 5 wt. %, or at least 10 wt. %, or at least 20 wt. %, or at least 30 wt. %, or at least 40 wt. %, or at least 50 wt. % and in some embodiments, up to 99 wt. %, or up to 90 wt. %, or up to 80 wt. % of the treatment composition. As will be appreciated, the treatment composition may be formulated as a concentrate, which is intended to be diluted with water before use. Such concentrates may be diluted in a ratio of, for example, from 1:1 to 1:100, such as from 1:2 to 1:20, when expressed as weight of concentrate:weight of water.

The water can be purified or non-purified water.

D2: Optional Organic Solvents

Optionally, the treatment compositions disclosed herein may include one or more organic solvents. Organic solvents are broadly defined as compounds that are liquid at temperatures of 20° C.-25° C. and which are not considered to be surfactants. One of the distinguishing features is that solvents tend to exist as discrete entities rather than as broad mixtures of compounds. Suitable solvents may contain from 1 carbon atom to 35 carbon atoms and in some embodiments, may contain contiguous linear, branched or cyclic hydrocarbon moieties of no more than 8 carbon atoms. The molecular weights of the solvents used herein may be less than 350, or between 100 and 300, or between 115 and 250.

Examples of suitable solvents include methanol, ethanol, propanol, isopropanol, 2-methyl pyrrolidinone, benzyl alcohol, morpholine n-oxide, and ether derivatives of mono-, di- and tri-ethylene glycol, propylene glycol, butylene glycol ethers, such as monoethylene glycol n-hexyl ether, monopropylene glycol n-butyl ether, and tripropylene glycol methyl ether and mixtures thereof. Among these solvents, ethanol is exemplary.

Ethylene glycol and propylene glycol ethers are commercially available from the Dow Chemical Company under the tradename Dowanol™ and from the Arco Chemical Company under the tradename Arcosolv™.

The organic solvent may be present in the treatment composition at from 1 to 99 wt. %, or up to 80 wt. %, or up to 70 wt. %, or up to 50 wt. %, or up to 20 wt. %, or up to 10 wt. %, or from 2 to 8 wt. %, or from 3 to 7 wt. %, of the hard surface treatment composition.

Example Treatment Compositions:

An example hard surface treatment (cleaning) composition includes:

A) 0.1-30 wt. % polymeric solids (based on the total weight of the composition) in the form of:
  i) an aqueous anionic polyurethane dispersion or
  ii) an aqueous anionic polyurethane-acrylic/styrenic hybrid dispersion comprising polyurethane dispersion i) and an acrylic/vinyl aromatic polymer, wherein the acrylic/vinyl aromatic polymer is prepared in the presence of the polyurethane dispersion i);

B) 0.001-50 wt. % of at least one detersive surfactant; wherein the ratio of the polymeric solids in A) to surfactant B) can range from 0.002 to 30000;

C) 0-50 wt. % of optional formulation adjuvants selected from superwetting agents, anti-foaming agents, perfumes, colorants, preservatives and other functional materials;

D) 0.025-99.8% diluent, such as water, such as at least 1 wt. % or at least 5 wt. % water; and wherein the sum of all components is 100 wt. %.

The polyurethane dispersion in the example treatment composition may include an anionic polyurethane dispersion which includes:

polymer particles which are the reaction product of:
  (i) 10.0-80.0 wt. % of a polyester or polyether polyol or combination thereof, having a molecular weight of 200 to 4000 g/mol.
  (ii) 2.0-10.0 wt. % of a carboxylic acid-containing diol as a water dispersability enhancing monomer;
  (iii) 10.0-80.0 wt. % of an organic polyisocyanate,
  (iv) 0.0-3.0 wt. % of a monomeric polyol having a molecular weight less than 300 g/mol,
  (v) 0.0-9.0 wt. % of a polyol having a pendent poly (alkylene oxide) side chain,
  (vi) 0.0-10.0 wt. % of a monomeric or polymeric trifunctional polyol as a branching and/or crosslinking agent,
  (vii) 0.0-7.0 wt. % of a chain extending polyamine of molecular weight less than 200 g mol,
  (viii) optionally, 0.01-10.0 wt. % of a non-reactive diluent; and
  (ix) water.

When (i)≥40 wt. % and when (i) is of molecular weight of about 3000 g/mol or greater, the sum of portions of (iv) and (v) of molecular weight less than 100 g/mol, may be kept to less than 0.8 wt. %.

The aqueous anionic polyurethane-acrylic/styrenic hybrid dispersion may include a condensation polymer which is the reaction product of the polymer particles above and:

0.001-30.0 wt. %, based on the weight of polymer solids, of a free-radical polymerization acrylic/vinyl aromatic polymer which is a reaction product of:
  (x) 30.0-90 wt. % of at least one $C_1$-$C_{22}$ alkyl ester of (meth)acrylic acid,
  (xi) 10.0-70.0 wt. % of at least one vinyl aromatic monomer, such as styrene, and
  (xii) 0.01-3.0 wt. % of initiator which is used to start the free radical polymerization, In particular, the I/A ratio of may be selected to be less than 0.03, or up to 0.02, or up to 0.01.

The total content of methyl methacrylate in the solid polyurethane-acrylic/styrenic hybrid may be kept at about 33.0 wt. % or less in one aspect, or at about 32.0 wt. % or less in another aspect.

In another embodiment, a hard surface disinfecting composition includes:

A. 0.001-30 wt. % (or 0.1-25 wt. %, or 0.5 to 20 wt. %, or 1-18 wt. %, or 5 to 17 wt. %, or 10 to 15 wt. %) polymeric solids comprising particles of an anionic polyurethane polymer or hybrid polymer, as described above;

B. optionally, a detersive surfactant, e.g., 0.001-50 wt. % of at least one detersive surfactant; wherein the ratio of the polymeric solids in A) to surfactant B) can range from 0.002 to 30000;

C. 0.1-99 wt. % (or 5-98 wt. %, or 65-96 wt. %) a disinfectant, such as ethanol or isopropanol; optionally, one or more other formulation adjuvants, such as 0.001-10 wt. % (e.g., at least 0.001 wt. % of a superwetting agent), and D. water, e.g., as the balance, which can be present in as small amount as that derived from forming the dispersion.

Application

The exemplary treatment composition can be applied to the surface to be cleaned/polished/disinfected using any suitable applicator, such as a mop, cloth, spray applicator or the like. The surface may be agitated with the applicator to remove dirt and debris. The remaining treatment composition may be left on the surface to dry, optionally with the aid of aeration, such as a fan, and/or heat from a heating device. Optionally, one or more additional coats may be applied and dried over the first. In some embodiments, at least some of the treatment composition may be rinsed from the surface, to remove the dirt.

In the case of wood surfaces to be cleaned/polished, they can be from any tree source or combination of tree sources, such as oak, pine, maple, cherry, beech, birch, cypress, teak, and the like. Wood surfaces can consist of solid wood, acrylic impregnated wood, engineered wood, or parquet wood. The wood surfaces can have a matte, semi-gloss, satin sheen or high gloss appearance. The exemplary compositions herein are effective for use on all these surfaces, but are especially effective on wood surfaces with semi-gloss or satin sheen. The exemplary compositions can also provide gloss enhancement benefits to polyurethane coated surfaces, such as floors and furniture. The compositions can be used for the cleaning of wood furniture.

Without intending to limit the scope of the exemplary embodiment, the following examples are provided.

EXAMPLES

In these examples, the following reagents were used:
Arcol PPG 2000, a polypropylene glycol (Mn=2,000), from Bayer Corp.
1,4-Butanediol (BDO)
Benzyl benzoate, from Alfa Aesar
2,2-Bis(methylol)propionic acid (Bis-MPA), from Geo Specialty Chemicals Inc.
Bromophenol blue indicator from Aldrich
Bruggolite™ FF6 M=polymerization initiator/reducing agent, from Bruggemann Chemicals (sodium salt of an organic sulfinic acid derivative)
Butyl acrylate (n-BA)
Chemoxide™ CAW surfactant=cocamidopropyl amine oxide (30% actives), from Lubrizol Advanced Materials, Inc.
Chemoxide™ MO=myristyl amine oxide (30% actives) surfactant, from Lubrizol Advanced Materials, Inc.
DABCO™ T-9 (T-9 catalyst)=stannous octoate, from Air Products
Dibutylamine (DBA) obtained from Air Products and Chemicals
Desmodur W=1,1'-methylenebis-(4-isocyanato cyclohexane), from Bayer Corporation (cycloaliphatic diisocyanate)
Dowanol™ PM solvent=propylene glycol methyl ether solvent, from The Dow Chemical Company
Dow Corning™ 1430 Fluid=silicone antifoam emulsion, from Dow Corning
Dow Corning™ Q2-5211 Fluid=silicone superwetting agent, from Dow Corning
Ethylenediamine (EDA), from Sigma Aldrich
FR-522=Dibromoneopentyl glycol, from ICL
Hydrochloric acid (HCl), from J. T. Baker
Isophorone diisocyanate (IPDI), from Bayer Corporation
Methyl methacrylate (MMA)
Multranol 4012=polypropylene oxide-based triol of molecular weight of 450, from Bayer Corp.
Neolone™ 950=isothiazolinone-based preservative, from The Dow Chemical Company
Noverite™ K-7058=acrylic acid based chelating agent, from Lubrizol Advanced Materials, Inc.
Novethix™ L-10 Polymer=thickener, from Lubrizol Advanced Materials, Inc.
N-ethyl-2-pyrrolidone (NEP), from Sigma Aldrich (non-reactive diluent)
Piothane 67-500 HNA=Poly(hexanediol neopentyl glycol adipate) polyester (Mn=500), from Panalom Industries.
Piothane 67-1000 HNA=Poly(hexanediol neopentyl glycol adipate) polyester (Mn=1000), from Panalom Industries.
Piothane 67-3000 HNA=Poly(hexanediol neopentyl glycol adipate) polyester (Mn=3000), from Panalom Industries
Styrene
Sulfochem™ SLS Sodium lauryl sulfate (30% actives), from Lubrizol Advanced Materials, Inc.
Tert-butyl hydroxyperoxide (TBHP)
Terathane™ 1000=polytetrahydrofuran (Mn=1,000), from Invista
Terathane™ 2000=polytetrahydrofuran (Mn=2,000), from Invista
Terathane™ 650=polytetrahydrofuran (Mn=650), from Invista
Tetramethyl-m-xylylene diisocyanate (TMXDI), from Cytec Industries, Inc.
Toluene from EMD Chemicals
Tomadol® 23-5 Linear alcohol ethoxylate surfactant, from Air Products
Triclosan=antibacterial and antifungal agent
Triethanolamine=neutralizer
Triethylamine (TEA), from J. T. Baker
Trimethylolpropane (TMP) from Celanese
Ymer™ N120=Trimethylolpropane monoethoxylate methyl ether (Mn=1,090), from Perstorp Polyols, Inc.

Test Methods

Measurements were made as follows:

Solids Content: Total solids were measured by Moisture/Solids Analyzer LabWare 9000™ obtained from CEM Corporation.

pH: pH readings were taken using Acumet Basic pH Meter (Fisher Scientific).

Viscosity: Brookfield viscosity testing was performed using a Brookfield RV viscometer at 20 rpm a temperature of about 77° C. for the prepolymer and using a Brookfield LV viscometer at 20 rpm a temperature of 25° C. for the polymer dispersion.

Particle Size: The particle size and size distribution of the dispersions and the zeta potentials were obtained using Malvern Zetasizer Nano-S90 with data analysis by Zetasizer Software 6.12 and NanoTrak™ particle size analyzer.

Isocyanate (NCO) Titration: A sample of prepolymer (about 3 grams) is weighted in a 250-ml Erlenmeyer flask. Toluene (50 ml) and 2M DBA solution in toluene (20 ml) are added and the mixture is heated on a hot plate until the prepolymer completely dissolves. The flask is filled up to 200 ml with isopropanol. Bromophenol blue indicator (6-7 drops) is added, and solution is titrated with 1N HCl solution until the color changes from blue to light yellow.

Preparation of Anionic Polyurethanes

Example 1

Anionic Polyurethane Dispersion

The following materials were charged to a reactor: Piothane 67-1000 HNA (131.7 grams), Ymer N-120 (9.8 grams), Bis-MPA (17.1 grams), BDO (4.9 grams), Desmodur W (164.5 grams) and benzyl benzoate (57.9 grams). The reaction mixture was slowly heated to 70.0° C. (161.6° F.) and 2 drops of T-9 catalyst were added. The reaction temperature was raised to 90° C. (194° F.) and maintained at this temperature for 1.5 hours with a mixing speed of 250 rpm. The remaining isocyanate (NCO) was determined by titration with DBA and 1.0 M HCl found to be 6.91° A). The reaction mixture was cooled to 77° C. (170.6° F.) and mixing speed raised to 600 rpm followed by addition of TEA (11.0 grams) over 10 minutes. The mixture was stirred for an additional 10 minutes resulting in a neutralized isocyanate-terminated urethane prepolymer. The Brookfield viscosity of the prepolymer was found to be 3200 cP at 77° C. (170.6° F.).

A portion of the urethane prepolymer (355 grams) was charged over the course of about 10 minutes into a reactor containing water (653 grams) at 25° C. (77° F.). When the dispersion of the prepolymer was complete, the dispersion had thickened greatly and the mixing speed of the mixer was then increased to 800 rpm. Additional water was added to thin down the dispersion and mixing speed was reduced to 600 rpm. Mixing was continued for about 30 minutes. Polymer chain extension was accomplished by addition of a 16.7% solution of EDA in water (77.6 grams) over 15 minutes. The reaction mixture was allowed to stir until no residual NCO was detectable by FTIR spectroscopy. Dispersion properties: Total solids=32.2%, pH=7.6, Brookfield viscosity=47 cP, and mean particle size=51 nm.

Examples 2-6

Polyurethane dispersions were prepared in the presence of benzyl benzoate in the same way as for Example 1, except for the ingredients and amounts used which are given in Table 1.

Example 2=Anionic Polyurethane Dispersion, No BDO.
Example 3=Anionic Polyurethane Dispersion with PTHF Polyol.
Example 4=Cross-linked Anionic Polyurethane Dispersion, Low MW polyol.
Example 5=Anionic Polyurethane Dispersion with Polyether+FR-522 (dibromoneopentyl glycol) polyols, cross-linked.
Example 6=Crosslinked Anionic Polyurethane Dispersion, Low MW polyol.

TABLE 1

| Ingredient | Ex. 1 | Ex. 2 | Ex. 3 | Ex. 4 | Ex. 5 | Ex. 6 |
|---|---|---|---|---|---|---|
| | | | Weight, g | | | |
| Piothane 67-1000 HNA (Polyester) | 131.7 | 168.4 | | | | |
| Piothane 67-500 HNA (Polyester) | | | | 143.9 | | |
| Piothane 67-3000 HNA (Polyester) | | | | | | 167.9 |
| Terathane 2000 (Polyether) | | | 190.5 | | 64.7 | |
| Arcol PPG 2000 (Polyether) | | | | | 64.7 | |
| YMER N120 (Polyol w/pend. PAO) | 9.8 | 10.0 | 10.0 | 10.7 | 9.9 | |
| Bis-MPA (carboxylic acid polyol) | 17.1 | 11.3 | 11.3 | 15.7 | 16.4 | 13.2 |
| BDO (Low MW polyol) | 4.9 | | 3.3 | 2.9 | | 1.7 |
| TMP (Low MW polyol) | | | | 0.7 | 0.66 | |
| FR-522 (Low MW polyol) | | | | | 32.8 | |
| Mutranol 4012 | | | | | | 4.4 |
| Desmodur W (diisocyanate) | 164.5 | 142.4 | 116.9 | 159.1 | 43.0 | 109.8 |
| TMXDI (diisocyanate) | | | | | 92.2 | |
| Benzyl Benzoate (Prepoylmer non-reactive diluent) | 57.9 | 58.6 | 58.6 | 39.6 | 58.6 | |
| NEP (non-reactive diluent) | | | | | | 58.4 |
| TEA (neutralizer) | 11.0 | 9.4 | 9.4 | 13.0 | 13.6 | 11.0 |
| Prepolymer Viscosity, cP (~77° C.) | 3200 | 2900 | 3300 | 5500 | 5460 | 4300 |
| Prepolymer Portion Dispersed | 355 | 365.1 | 368.1 | 250 | 240 | 360.1 |
| Water | 653 | 690.0 | 700.0 | 605 | 498 | 690 |
| EDA (17% Solution) (Chain extender) | 77.6 | 68.1 | 56.0 | 65.7 | 37.4 | 31.8 |
| Polymer Dispersion Properties | | | | | | |
| Total Solids, % | 32.2 | 32.8 | 33.0 | 26.8 | 32.4 | 28.5 |
| pH | 7.6 | 7.1 | 7.1 | 7.1 | 7.2 | 7.0 |
| Viscosity, cP (at 25° C.) | 47 | 28 | 40 | 40 | 30 | 28 |
| Particle Size, nm | 51 | 131 | 88 | 136 | 68 | 64 |

Examples 7 and 8

Polyurethane dispersions were prepared in the presence of N-ethyl-2-pyrrolidone in the same way as for Example 1, except for the ingredients and amounts used which are given in Table 2.
Example 7=Anionic Polyurethane Dispersion with 64% Soft Segment, with NEP.
Example 8=Anionic Polyurethane Dispersion with NEP).

TABLE 2

| Ingredient | Example 7 | Example 8 |
|---|---|---|
| | Weight, g | |
| Piothane 67-1000 HNA (Polyester) | 170.3 | 52.1 |
| Piothane 67-3000 HNA | | 167.9 |
| Bis-MPA | 13.2 | 13.2 |
| BDO | 1.7 | 1.7 |
| Multranol 4012 | 4.4 | 4.4 |
| Desmodur W | 141.1 | |

TABLE 2-continued

| Ingredient | Example 7 | Example 8 |
|---|---|---|
| | Weight, g | |
| IPDI | | 91.3 |
| N-ethyl-2-pyrrolidone (Diluent) | 58.4 | 58.4 |
| TEA | 11.0 | 11.0 |
| Prepolymer Viscosity, cP (~77° C.) | 5800 | 4300 |
| Prepolymer Portion Dispersed | 352 | 360 |
| Water | 668 | 690 |
| EDA (17% Solution) | 48.3 | 31.8 |
| Polymer Dispersion Properties | | |
| Total Solids, % | 29.5 | 28.5 |
| pH | 6.9 | 7.0 |
| Brookfield Viscosity, cP (at 25° C.) | 27 | 28 |
| Particle Size, nm | 59 | 64 |

2. Acrylic/Urethane Hybrid Polymers

Example 9 a) Polyurethane Dispersion

The following materials were charged to a reactor: Piothane 67-1000 HNA (305.1 grams), Ymer N-120 (20.3 grams), Bis-MPA (31.1 grams), BDO (2.0 grams), Desmodur W (316.7 grams) and benzyl benzoate (119.1 grams). The reaction mixture was slowly heated to 70.0° C. (161.6° F.) and 2 drops of T-9 catalyst were added. The reaction temperature was raised to 104° C. (219.2° F.) and maintained at this temperature for 1.5 hours. The remaining isocyanate (NCO) was determined by titration with DBA and 1.0M HCl found to be 6.17%. The reaction mixture was cooled to 77° C. (170.6° F.) followed by addition of TEA (25.8 grams) over 10 minutes. The mixture was stirred for an additional 10 minutes resulting in a neutralized isocyanate-terminated urethane prepolymer. The viscosity of the prepolymer was found to be 3500 cP at 78° C. (172.4° F.).

A portion of the urethane prepolymer (755.5 grams) was charged over the course of about 10 minutes into a reactor containing water (1248.0 grams) at 25° C. (77° F.). When the dispersion of the prepolymer was complete, mixing was continued for about 50 minutes. Polymer chain extension was accomplished by addition of a 16.7% solution of EDA in water (156.1 grams) over 15 minutes. The reaction mixture was allowed to stir until NCO was not detectable by IR spectroscopy. This resulted in a clean (no coagulum and floc) stable aqueous polyurethane dispersion suitable for use in urethane/acrylic hybrid formation. The total solids for the polymer dispersion were found to be 34.2%.

b) Urethane/Acrylic Hybrid Dispersion

A portion of the polyurethane dispersion (511.4 grams) described in Example 9(a) above was combined with additional water (47.1 grams), MMA (6.0 grams), n-BA (6.0 grams) and styrene (24.0 grams) in a 1L jacketed reactor. The reaction mixture was purged with nitrogen for 10 minutes and mixing was started. After approximately 30 minutes of mixing, a 5.0% solution of TBHP (1.1 grams) was added under a blanket of nitrogen and the reaction mixture was slowly heated to 50° C. (122.0° F.). A 5.0% solution of Bruggolite™ FF6 (1.7 grams) was added resulting in a slight exotherm. The reaction mixture was maintained at about 50° C. (122.0° F.) for 2 hours. A second initiator/redox polymerization booster consisting of 5.0% solution of TBHP (1.1 grams) and 5.0% solution of Bruggollite™ FF6 (1.7 grams) were added followed by mixing for an additional 30 minutes. The amount of TBHP used to initiate the free radical polymerization was such that the I/A ratio (ratio of the initiator amount (in parts per hundred monomer, phm) to the wt. % units in the hybrid polymer derived from ethylenically unsaturated monomers) was 0.008.

This afforded a clean (no coagulum and floc) stable aqueous polyurethane/acrylic hybrid dispersion having the following properties: total solids=35.6%, pH 8.7, viscosity=46 cP, mean particle size=74 nm.

Examples 10-14

The same procedure and conditions as used in Example 9 were followed to prepare the urethane/acrylic polymer hybrids, except that ingredients and amounts used are shown in Table 3. Polymer dispersion properties are also given in the same table.

TABLE 3

| Ingredient | Example 10 | Example 11 | Example 12 Weight, g | Example 13 | Example 14 |
|---|---|---|---|---|---|
| Polyurethane Dispersion Portion Prepared Per Example 6 | 511.4 | 511.4 | 293.0 | 293.0 | 293.0 |
| Water | 47.1 | 47.1 | 124.3 | 124.3 | 161.9 |
| MMA | 24.0 | 6.0 | 27.5 | 13.8 | 13.8 |
| n-BA | 6.0 | 24.0 | 27.5 | 55.0 | 55.0 |
| Styrene | 6.0 | 6.0 | 27.5 | 13.8 | 13.8 |
| I/A Ratio | 0.008 | 0.008 | 0.012 | 0.008 | 0.003 |
| Polymer Dispersion Properties | | | | | |
| Total Solids, % | 35.8 | 35.8 | 32.8 | 32.5 | 33.5 |
| pH | 7.4 | 7.5 | 7.5 | 7.4 | 7.6 |
| Viscosity, cP (at 25° C.) | 53 | 62 | 26 | 26 | 38 |
| Particle size, nm | 74 | 72 | 115 | 117 | 93 |

Examples 15 and 16

High MMA Content in Polymer Hybrid

The same procedure and conditions as were used in Example 9 were followed to prepare urethane/acrylic polymer hybrids, except that ingredients and amounts used are shown in Table 4. Polymer dispersion properties are also given in the same table. The polymers have high MMA content in the polymer hybrid, resulting in lower delta gloss than in the preceding examples.

TABLE 4

| Ingredient | Example 15 | Example 16 Weight, g |
|---|---|---|
| Polyurethane Dispersion Portion Prepared Per Example 6 | 319.6 | 293.0 |
| Water | 178.7 | 124.3 |
| MMA | 60 | 55 |
| n-BA | 15 | 13.8 |
| Styrene | 15 | 13.8 |
| I/A Ratio | 0.003 | 0.012 |
| Polymer Dispersion Properties | | |
| Total Solids, % | 33.6 | 32.6 |
| pH | 7.4 | 7.2 |
| Viscosity, cP (at 25° C.) | 36 | 26 |
| Particle size, nm | 82 | 100 |

Examples 17-20

High I/A Ratio

The same procedure and conditions as were used in Example 13 were followed to prepare urethane/acrylic polymer hybrids, except that ingredients and amounts used are shown in Table 5. Polymer dispersion properties are also given in the same table. The polymers have a high I/A ratio, resulting in lower water resistance.

TABLE 5

| Ingredient | Example 17 | Example 18 | Example 19 | Example 20 |
|---|---|---|---|---|
| | | Weight, g | | |
| Polyurethane Dispersion Portion Prepared Per Example. 6 | 511.4 | 511.4 | 5114.7 | 468.8 |
| Water | 30.7 | 30.7 | 30.7 | 28.1 |
| MMA | 12 | 6.0 | 6.0 | 22 |
| n-BA | 12 | 6.0 | 24 | 5.5 |
| Styrene | 12 | 24 | 6.0 | 5.5 |
| I/A Ratio | 0.03 | 0.03 | 0.03 | 0.03 |
| Polymer Dispersion Properties | | | | |
| Total Solids, % | 35.7 | 35.4 | 35.5 | 36.4 |
| pH | 7.4 | 7.7 | 7.5 | 7.7 |
| Viscosity, cP (at 25° C.) | 41 | 46 | 43 | 66 |
| Particle size, nm | 73 | 73 | 74 | 76 |

Examples 21-22

High Particle Size

The preparation of the polyurethane dispersions having particle sizes higher than 170 nm, were conducted the same way as in Example 1, except for the ingredients and amounts used are given in Table 6.

TABLE 6

| Ingredient | Example 21 Anionic Polyurethane Dispersion with Large Particle Size | Example 22 Anionic Polyurethane Dispersion with Large Particle Size |
|---|---|---|
| | Weight, g | |
| Piothane 67-1000 HNA | 41.7 | 52.8 |
| Piothane 67-3000 HNA | 134.4 | 169.9 |
| YMER N120 | 33.1 | |
| Bis-MPA | 13.2 | 13.2 |
| BDO | 1.7 | 1.7 |
| TMP | 1.3 | 1.3 |
| Desmodur W | 105.2 | |
| IPDI | | 91.8 |
| Benzyl Benzoate | | 58.4 |
| N-Ethylpyrrolidone | 58.4 | |
| TEA | 11.0 | 11.0 |
| Prepolymer Viscosity, cP (~77° C.) | 13800 | 8800 |
| Prepolymer Portion Dispersed | 340 | 350 |
| Water | 652 | 668 |
| EDA (17% Solution) | 28.3 | 37.9 |
| Polymer Dispersion Properties | | |
| Total Solids, % | 29.0 | 32.6 |
| pH | 7.2 | 6.8 |
| Viscosity, cP (at 25° C.) | 381 | 19 |
| Particle Size, nm | 174 | 203 |

Examples 23-24

High PEO

The preparation of the polyurethane dispersions having high amounts of PEO were conducted the same way as in Example 1 except for the ingredients and amounts used are given in Table 7.

TABLE 7

| Ingredient | Example 23 Anionic Polyurethane Dispersion with higher PEO-10%, No benzyl benzoate | Example 24 Nonionic Polyurethane Dispersion with higher PEO-18% No benzyl benzoate |
|---|---|---|
| | Weight, g | |
| Piothane 67-1000 HNA | | |
| Terathane 1000 | 355.9 | |
| Terathane 250 | | 90.7 |
| Pripol 2033 | | 171.6 |
| YMER N120 | 72.6 | 147.6 |
| Bis-MPA | 18.9 | |
| BDO | 5.8 | |
| TMP | | 4.1 |
| Desmodur W | 141.3 | 134.5 |
| TMXDI | 131.6 | |
| TEA | 14 | |
| Prepolymer Viscosity, cP (~77° C.) | 7660 | |
| Prepolymer Portion | 573 | 780 |
| Dispersed Water | 1396 | 913 |
| EDA (17% Solution) | 114.9 | 218 |
| Polymer Dispersion Properties | | |
| Total Solids, % | 28.4 | 42.9 |
| pH | 7.4 | 7.1 |
| Viscosity, cP (at 25° C.) | 37 | 248 |
| Particle Size, nm | 85 | 129 |

3. Formulation Examples
Formulation Preparation:

The wt. % solids in the polymer dispersions described above ranged from 26 to 36%. Formulations F1-24 are prepared using the polymers of the Examples above by making formulations containing 13% polymer actives of the aqueous polymer dispersions with 0.1% of wetting agent (Dow Corning Q2-5211), 2% cosolvent (Dowanol PM) and the balance water, to make a total of 100%. All the ingredients were sufficiently mixed with an impeller to make the formulation. Formulations with polymers from comparative examples were made in exact manner.

Test Methods

1. Method for Measurement of ΔGloss:

A method was developed for evaluating shine on hard surface, as follows:

To form an applicator, a small plastic block with a rubber bottom is used. The block measures about 3×5 cm, with a height of 1-1.5 cm. A cotton swatch (approx. 7×10 cm) is folded length-wise then the applicator (rubber side down) is placed on the folded swatch. The remaining part of the swatch is folded up over the sides of the block to form the applicator.

Ceramic tiles were obtained with an available area of no more than 250 cm² per 1 gram of polymer solution to be applied. Using the colorimeter, gloss readings are recorded at a 60° angle in 3 different locations of the untreated tile surface. Gloss was measured with a hand-held colorimeter (BYK micro-TRI glossmeter) capable of reading at a 60° gloss. The average 60° gloss of the tile was 29 gloss units. The values should be within 1 gloss unit. The average of the 3 readings is recorded. This is the "before" gloss measurement.

The tiles were weighed and 1 gram of the exemplary treatment composition including the polyurethane dispersion is applied onto the middle of the testing substrate (tile) and the weight recorded. The difference in weight of the tile was recorded as the weight of solution applied to the substrate.

The cotton swatch applicator is placed in a plastic weighing boat on the scale, and the scale tared to zero. The cotton swatch applicator is placed on top of the liquid. Using a gentle sliding motion, the applicator is moved over the test liquid up and down across the substrate from left to right, then from right to left. The applicator is then immediately removed from the substrate and placed back in the weighing boat and the weight recorded. This is recorded as the weight removed from the substrate.

The weight of the solution applied to the tile substrate is calculated=weight applied to substrate-weight removed from substrate (with applicator).

The tile substrate is allowed to dry for at least 20 minutes.

After the drying, gloss readings are recorded at a 60° angle in 3 different locations on the testing substrate and the average recorded as the "after" gloss measurement.

The change in gloss (Δ gloss) is calculated as follows:

Δ gloss=after gloss-before gloss

2. Method for Measurement of Water Resistance:

A 4×4 ceramic tile, typical of what can be purchased at a home improvement store is used for the test. The tile should be of a dark color, i.e. brown or black (not white, off-white or a bright color).

An cotton swatch covered applicator is prepared as described above. About 0.8 gram of the exemplary treatment composition is measured onto the middle of the testing substrate and its weight recorded. The cotton swatch applicator is placed on top of the liquid. Using a gentle sliding motion, the applicator is moved over the test liquid up and down across the substrate from left to right, then from right to left. Immediately, the applicator is removed from the substrate and the amount applied to the substrate calculated as described above.

The substrate is allowed to dry for at least 20 minutes.

A container (e.g., Pyrex) sized to fit the tile is filled with tap water to a water level of 2 cm. After 20 minutes drying, the tile is placed into the container so it is fully covered by water and left submerged for 5 minutes. The tile is then removed from the water by picking it up by its sides and placed on a folded paper towel to dry.

The result of the water resistance tests are either pass or fail. This is determined by what is observed during the submergence and after the tile dries. A Fail corresponds to any one of:

a. A significant amount of polymer lifted off of the tile while submerged.

b. The polymer blistered on the tile while submerged and did not recover once dried.

c. Polymer discolored while submerged and remained discolored when dry.

A Pass corresponds to:

a. None to a small amount (less than 10% of the tile surface) of polymer lifted off the tile while submerged and dried with no sign of ever being wet.

b. The polymer blistered while submerged, but recovered to a smooth, shiny finish when dry.

c. The polymer discolored while submerged, but recovered to a smooth, shiny finish when dry.

3. Stain Resistance Test Method 1.5 g cleaner is applied on a panel (wood or laminate floor section 6 inches wide) using a cotton or non-woven cloth and the panel allowed to dry for 20 minutes.

10 g of stain (pasta sauce) is applied to the treated panel and swirled in a circular pattern. The stained panel is left for 24 hours then rinsed in hot water and spayed with a "kitchen" sprayer, until all sauce is removed.

The panel is laid down flat and allowed to air dry.

Staining was observed visually. The result is either Pass or Fail. Fail corresponds to discoloration or spotting or fading of the area where the stain was applied. Pass corresponds to no visible fading or discoloration of the area where the stain was applied.

4. Coefficient of Friction Test Method

Static and dynamic coefficient of friction provide an indication of whether the substrates treated by way of polishing, wiping or mopping with the polymer formulation will become slippery. Brazilian cherry laminate wood, red oak natural wood and vinyl composite tiles (VCT) were treated by wiping 1 g of a formulation prepared with the polymer dispersion of Ex. 9 using the applicator described above. The panels were tested for static coefficient of friction by the James Machine equipped with leather shoe sole according to ASTM Method D2047. Dynamic coefficient of friction was measured using an IMass TL-2200. The sole surface was rubber foam and testing speed was 40 in/min using 200 g weight. All the measurements were conducted at 22-23° C. at 46% relative humidity. Table 17 shows the static and dynamic coefficient of friction values for formulations F1 to F8 prepared with the dispersions of Examples 1 to 8, respectively.

TABLE 8

Gloss and water resistance data for formulations prepared with Anionic Polyurethane Dispersion Formulations

| Formulation Example | % PEO in Polyurethane | Average ΔGloss (60°) | Water Resistance |
| --- | --- | --- | --- |
| Example F1 | 3.0 | 30.2 | Pass |
| Example F2 | 3.0 | 35.8 | Pass |
| Example F3 | 3.0 | 37.8 | Pass |
| Example F4 | 3.0 | 31.5 | Pass |
| Example F5 | 3.0 | 28.8 | Pass |
| Example F6 | 0 | 30.9 | Pass |
| Example F7 | 3.0 | 32.1 | N/A |
| Example F8 | 3.0 | 30.9 | N/A |

Formulations F1-6 were prepared with anionic polyurethane dispersions from Examples 1-6 and show a significant improvement in gloss of the treated tile. All of these formulations also pass the water resistance test.

The gloss data of formulations F7-8 prepared with anionic polyurethane dispersions from Examples 7 and 8, prepared in the presence of a non-reactive diluent, N-ethyl-2-pyrrolidone, also show a significant improvement in gloss of the treated tile.

Table 9 shows the performance of formulations F9-F14, which contain the acrylic/styrenic-urethane hybrid polymers from Examples 9-14. All polymers in these formulation examples were made in such a manner that in the acrylic polymerization phase, the I/A ratio was less than 0.01, and the amount of MMA in the hybrid polymer was always kept less than 32%. All the formulations exhibit significant improvements in gloss on tile and also pass the water resistance test. The lower levels of the I/A are therefore thought to be associated with good water resistance in the example polymer hybrid formulations.

TABLE 9

Gloss and water resistance data for formulations prepared with acrylic-urethane hybrid polymer dispersions of Examples 9-14

| Formulation examples | Wt % MMA in Hybrid | Initiator(phm)/ [AC] in hybrid (I/A ratio) | Average ΔGloss (60°) | Water Resistance |
| --- | --- | --- | --- | --- |
| Example F9 | 3 | 0.008 | 36.5 | Pass |
| Example F10 | 13 | 0.008 | 33.3 | Pass |
| Example F11 | 3 | 0.008 | 35.0 | Pass |
| Example F12 | 17 | 0.012 | 33.2 | Pass |
| Example F13 | 8 | 0.008 | 32.8 | Pass |
| Example F14 | 8 | 0.003 | 31.6 | Pass |

Table 10 shows the performance of formulations F15 and F16, which contain the acrylic/styrenic-urethane hybrid polymers from Examples 15 and 16. The two formulations show relatively poor improvements in gloss on tiles and do not meet the selected gloss enhancement criteria for the polymers. The polymers contain relatively high amounts of MMA (~33%) in the polymer hybrid. High amounts of MMA are therefore associated with lower improvements in gloss. The polymers do pass the water resistance test.

TABLE 10

Gloss and water resistance data for formulations F15 and F16 prepared with examples of acrylic/styrenic-urethane hybrid dispersions having high MMA content in the hybrid

| Formulation Examples | % MMA in Hybrid | Initiator(phm)/ [AC] in hybrid (I/A ratio) | Average ΔGloss (60°) | Water Resistance |
| --- | --- | --- | --- | --- |
| Example F15 | 33 | 0.003 | 21.7 | Pass |
| Example F16 | 33 | 0.012 | 23.8 | Pass |

Table 11 shows the performance of formulations F17-F20, which contain the acrylic/styrenic-urethane hybrid polymers from Examples 17-20. All polymers in these examples were made in such a way that in the acrylic polymerization phase, the I/A ratio was 0.03 and the amount of MMA in the hybrid polymer was varied and kept at less than 32%. All the formulations exhibit significant improvements in gloss on tile. The formulations, however, fail the water resistance test. The high I/A ratio may be associated with poorer water resistance of the polymer hybrid formulations of these examples.

TABLE 11

Gloss and water resistance data for formulations prepared with examples of acrylic/styrenic-urethane dispersions at high initiator levels

| Formulation Examples | % MMA in Hybrid | Initiator(phm)/ [AC] in hybrid (I/A ratio) | Average ΔGloss (60°) | Water Resistance |
| --- | --- | --- | --- | --- |
| Example F17 | 7 | 0.03 | 34.5 | Fail |
| Example F18 | 3 | 0.03 | 34.7 | Fail |
| Example F19 | 3 | 0.03 | 35.2 | Fail |
| Example F20 | 13 | 0.03 | 33.2 | Fail |

Table 12 shows gloss data of formulations prepared with anionic polyurethane dispersions from Examples 21 and 22, which had mean particles sizes higher than 170 nm and did not significantly improve gloss, based on the selected performance criteria.

TABLE 12

Gloss and water resistance data for formulations prepared with Dispersions of Examples 21 and 22

| Formulation examples | Mean particle size (nm) | Average ΔGloss (60°) | Water Resistance |
|---|---|---|---|
| Example F21 | 174 | 15.3 | — |
| Example F22 | 203 | 22.7 | — |

Table 13 shows gloss and water resistance data of formulations F23 and F24, prepared with anionic polyurethane dispersions of Examples 23 and 24. Both formulations failed the water resistance test. These examples were prepared with a high PEO portion (10% and 18%, respectively).

TABLE 13

Gloss and water resistance data for formulations prepared with anionic polyurethane dispersions of Examples 15 and 16

| Formulation examples | % PEO in Polyurethane | Average ΔGloss (60°) | Water Resistance |
|---|---|---|---|
| Example F23 | 10 | 28.0 | Fail |
| Example F24 | 18 | 29.0 | Fail |

Gloss on Leneta Chart:

A formulation was made by mixing the ingredients shown in Table 14 for 30 minutes:

TABLE 14

Composition for testing Leneta gloss

| Ingredient | Weight % |
|---|---|
| Polymer Example 9 actives | 28.00 |
| Dowanol ™ PM Solvent | 4.00 |
| Dow Corning ® Q2-5211 | 0.20 |
| Deionized water | 67.80 |
| Total | 100.00 |

A Leneta Opacity Chart (Form N2C-3) was placed on the BYK Automatic Film Applicator equipped with a vacuum plate. The traverse speed was 10 mm/s and the stroke length was 25-235 mm. About 5 mL of formulation was pipetted near the top of the chart. Using a 1-mil draw-down bar, a film of 25.4 μm (1 mil) wet thickness was made. The film was dried on the stage under ambient conditions for at least 2 h. The chart was placed in a vacuum oven at 100° C. for 5-6 h for additional drying. The 60° gloss of the draw-down film was measured using a BYK micro-TRI Gloss meter. For the formulation with polymer Example 9, the 60° Leneta gloss was 66.83±1 Gloss Units.

Additional Formulations:

Table 15 shows the application examples A1-A3 of the acrylic/styrenic-urethane hybrid polymers at lower use levels in the formulation up to 2%. Application example A4, without any polymer, showed insignificant improvement in gloss of the tile. Application examples 1-3 show the increase in Δgloss with increasing polymer actives in the formulation.

TABLE 15

Applications Examples A1, A2, A3, A4: Spray and wipe hard surface cleaner with polymer dispersion of Example 6

| Ingredient | Weight % | | | |
|---|---|---|---|---|
| | Ex. A1 | Ex. A2 | Ex. A3 | Ex. A4 |
| Deionized Water | q.s. 100 | q.s. 100 | q.s. 100 | q.s. 100 |
| Polymer Example 9, actives | 0.5 | 1.0 | 2.0 | 0 |
| Dow Corning ™ Q2-5211 Fluid (silicone superwetting agent) | 0.08 | 0.08 | 0.08 | 0.08 |
| Dowanol ™ PM Solvent (propylene glycol methyl ether solvent) | 2.00 | 2.00 | 2.00 | 2.00 |
| Tomadol ™ 25-7 (100%) (linear alcohol ethoxylate surfactant) | 0.10 | 0.10 | 0.10 | 0.1 |
| Sulfochem ™ SLS (sodium lauryl sulfate surfactant), actives | 0.34 | 0.34 | 0.34 | 0.34 |
| Neolone ™ 950 (preservative) | 0.15 | 0.15 | 0.15 | 0.15 |
| Total | 100 | 100 | 100 | 100 |
| Average ΔGloss (60°) | 2.2 | 5.9 | 7.8 | 0.5 |

Table 16 shows the floor cleaner application example of acrylic/styrenic-urethane hybrid polyurethane dispersion at 13% polymer actives use level. Application example A5 exhibited significant improvement in gloss. Application example A5 also passed the water resistance test and stain resistance test.

TABLE 16

Application Example 5: Floor cleaner with 13% polymer actives

| Ingredient | Weight % |
|---|---|
| Polymer of Example 9, actives | 13 |
| Dow Corning ™ Q2-5211 Fluid | 1.00 |
| Dow Corning ™ 1430 Fluid (silicone antifoam emulsion) | 0.40 |
| Dowanol ™ PM Solvent | 2.00 |
| Sulfochem ™ SLS Surfactant, actives | 0.17 |
| Neolone ™ 950 | 0.15 |
| Deionized Water | q.s. 100 |
| Total | 100.00 |
| Average ΔGloss (60°) | 37.1 |
| Water Resistance | Pass |
| Stain Resistance | Pass |

Table 17 shows the static and dynamic coefficients of frictions (CoF) of various floor substrates treated with application example A5 and two commercial products (Ex. C1 and Ex. C2). According to the ASTM Standard Test procedure D2047, under standard test conditions a static CoF of more than 0.5 indicates safe walking condition of the treated surface. Also dynamic CoF was measured to simulate walking conditions. It was found that the floor surfaces treated with application example A5 did not form a slippery surface. This indicates that the composition improves shine without making the surface slippery.

TABLE 17

Static and dynamic coefficient of friction

| Treatment | Static Coefficient of Friction (average with standard deviation) | | | Dynamic Coefficient of Friction (average with standard deviation) | | |
|---|---|---|---|---|---|---|
| | Brazilian Cherry | Red Oak Natural | VCT | Brazilian Cherry | Red Oak Natural | VCT |
| Untreated | 0.32 ± 0.0082 | 0.45 ± 0.04 | 0.64 ± 0.036 | 0.42 ± 0.025 | 0.34 ± 0.04 | 0.55 ± 0.005 |
| Ex. A5 | 0.54 ± 0.037 | 0.69 ± 0.081 | 0.73 ± 0.13 | 0.57 ± 0.03 | 0.53 ± 0.03 | 0.5 ± 0.012 |
| Ex. C1 | 0.68 ± 0.12 | 0.71 ± 0.06 | 0.71 ± 0.07 | 0.77 ± 0.016 | 0.87 ± 0.03 | 0.72 ± 0.035 |
| Ex. C2 | 0.51 ± 0.02 | 0.53 ± 0.025 | 0.71 ± 0.051 | 0.52 ± 0.014 | 0.49 ± 0.011 | 0.64 ± 0.012 |

Table 18 shows water-dilutable multi-purpose cleaning formulations as application examples A6 and A7 with and without the polymer from Example 9 respectively. Measurements of Average 60° ΔGloss were made after application of the diluted formulation on tile, where the dilution rate was 1 cup in 1 gallon of water. Application example A6 had 3.09 units improvement in gloss whereas application example A7 had only 0.56 units improvement in gloss upon application on tile after dilution.

TABLE 18

Application examples A6-A7: Water-dilutable multi-purpose cleaner

| | Weight % | |
|---|---|---|
| Ingredient | Ex. A6 | Ex. A7 |
| Deionized Water | 79.52 | 89.52 |
| Novethix ™ L-10 Polymer (thickener) | 1.00 | 1.00 |
| Triethanolamine (neutralizer) | 1.00 | 1.00 |
| Chemoxide ™ MO (myristyl amine oxide) | 3.48 | 3.48 |
| Tomadol 25-7 | 1.50 | 1.50 |
| Ethanol | 3.00 | 3.00 |
| Polymer Example 9 actives | 10.00 | 0.00 |
| Noverite ™ K-7058 (acrylic acid based chelating agent) | 0.50 | 0.5 |
| Average 60° ΔGloss | 3.09 | 0.56 |

Table 19 shows application examples of disinfecting formulations with ethanol and triclosan. Application example A12 is a control formulation without any film-former. Application examples A13, A14 and A15 contain 1, 0.5 and 2% of polymer from example 9, respectively. Application example A12 imparted slight loss in the gloss of the ceramic tile when applied. However upon adding the polymer from example 9, the formulations A13, A14 and A15 improved the gloss of the tiles significantly. This shows the use of the polymer in ethanol-based formulations and it also shows that the polymer can help improve the gloss of substrate after the cleaning when the formulation without the polymer may decrease the gloss of the tile.

TABLE 19

Application examples A12-A15: Disinfecting hard surface cleaner

| | Weight % | | | |
|---|---|---|---|---|
| Ingredient | Ex. A12 | Ex. A13 | Ex. A14 | Ex. A15 |
| Deionized Water | 67.70 | 66.70 | 67.20 | 65.70 |
| Ethanol | 30.00 | 30.00 | 30.00 | 30.00 |
| Triclosan (antibacterial and antifungal agent) | 0.20 | 0.20 | 0.20 | 0.20 |
| Tomadol ® 23-5 (linear alcohol ethoxylate surfactant) | 1.00 | 1.00 | 1.00 | 1.00 |

TABLE 19-continued

Application examples A12-A15: Disinfecting hard surface cleaner

| | Weight % | | | |
|---|---|---|---|---|
| Ingredient | Ex. A12 | Ex. A13 | Ex. A14 | Ex. A15 |
| Chemoxide ™ CAW Surfactant (cocamidopropyl amine oxide) | 1.00 | 1.00 | 1.00 | 1.00 |
| Polymer Example 9 actives | 0.00 | 1.00 | 0.50 | 2.00 |
| Dow Corning ® Q2-5211 | 0.10 | 0.10 | 0.10 | 0.10 |
| Average 60° ΔGloss | −0.61 | 13.29 | 12.03 | 17.21 |

Table 20 shows an alcohol-heavy treatment formulation A16 prepared by mixing the ingredients for at least 30 minutes. This formulation of the polymer contains very little water, which was derived from the polymer dispersion. Ethanol is used as the major diluent in this formulation. No detersive surfactant is present, although it is to be appreciated that for cleaning compositions, a detersive surfactant may be employed, as described above.

TABLE 20

Heavy-alcohol formulation

| Ingredient | Weight % | Function |
|---|---|---|
| Polymer Example 9 (actives) | 2.0 | Shine Agent |
| Ethanol | 94.1 | Diluent |
| Dow Corning ® Q2-5211 (superwetting agent) | 0.1 | Superwetting agent |
| Water | 3.8 | Diluent |
| Total | 100 | |
| Average ΔGloss (60°) | 11.99 ± 0.15 | |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the expression "consisting essentially of" permits the inclusion of substances that do not materially affect the basic and novel characteristics of the composition under consideration. As used herein any member of a genus (or list) may be excluded from the claims.

As used herein, the term "(meth) acrylic" and related terms includes both acrylic and methacrylic groups.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

a. hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

b. substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

c. hetero substituents, that is, substituents which, while having a predominantly hydrocarbon character, in the context of this invention, contain other than carbon in a ring or chain otherwise composed of carbon atoms; and d. heteroatoms include sulfur, oxygen, nitrogen, and encompass substituents as pyridyl, furyl, thienyl and imidazolyl. In general, no more than two, in one aspect no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. Use of a composition as a hard surface cleaner and shine enhancer comprising:
   applying the composition to a hard surface wherein the composition comprises:
   0.001-50 wt. % of at least one detersive surfactant;
   at least 10 wt. % of a diluent, the diluent including water; and
   0.01-40 wt. % of particles consisting essentially of at least one of A) an anionic polyurethane polymer and B) an anionic polyurethane hybrid polymer, as an aqueous dispersion, the particles having an mean particle size of less than 170 nm (as measured by a Malvern Zetasizer Nano-S90 particle size analyzer with a data analysis by Zetasizer Software 6.12), wherein the anionic polyurethane hybrid polymer B) is prepared from at least one ethylenically unsaturated monomer in the presence of a preformed polyurethane polymer, and
   optionally, rinsing at least some of the applied composition from the hard surface;
   wherein the anionic polyurethane polymer A) is the reaction product of:
   (i) 10-80 wt. % of at least one of a polyester polyol and a polyether polyol, the at least one of the polyester polyol and polyether polyol having a number average molecular weight of up to 4000 g/mol;
   (ii) 2-10 wt. % of an anionic water dispersability enhancing monomer;
   (iii) 10-80 wt. % of a polyisocyanate; and
   optionally at least one of:
   (iv) a low molecular weight polyol which is other than a polyester polyol and a polyether polyol;
   (v) a nonionic water dispersibility enhancing monomer;
   (vi) a chain extender;
   (vii) a neutralizing agent; and
   (viii) a non-reactive diluent; and
   wherein the anionic polyurethane hybrid polymer B) comprises:
   (1) an anionic polyurethane component which is the reaction product of:
   (i) 10-80 wt. % at least one of a polyester polyol and a polyether polyol, the at least one of the polyester polyol and polyether polyol having a number average molecular weight of up to 4000 g/mol;
   (ii) 2-10 wt. % of an anionic water dispersability enhancing monomer;
   (iii) 10-80 wt. % the polyisocyanate; and
   optionally, at least one of:
   (iv) a low molecular weight polyol which is other than a polyester polyol and a polyether polyol;
   (v) a nonionic water dispersibility enhancing monomer;
   (vi) a chain extender;
   (vii) a neutralizing agent; and
   (viii) a non-reactive diluent; and
   (2) an addition polymer which is the reaction product of:
   (ix) a vinyl aromatic monomer and a (meth)acrylate monomer; and
   (x) an initiator.

2. The use of a composition of claim 1, wherein a ratio of the polymer to the surfactant is from 0.002:1 to 30,000:1 by weight.

3. The use of a composition of claim 1, wherein a ratio of surfactant to the at least one of the anionic polyurethane polymer and anionic polyurethane hybrid polymer is at least 0.05:1.

4. The use of a composition of claim 1, wherein the particles have an mean particle size of less than 150 nm.

5. The use of a composition of claim 1, wherein the particles comprise particles of anionic polyurethane hybrid polymer, the particles of anionic polyurethane hybrid polymer having been prepared from at least one ethylenically unsaturated monomer in the presence of a preformed polyurethane polymer, whereby the particles of anionic polyurethane hybrid polymer comprise a polymer derived from the at least one ethylenically unsaturated monomer supported within particles of polyurethane polymer.

6. The use of a composition of claim 1, wherein the at least one of the polyester polyol and polyether polyol has a molecular weight of at least 200 g/mol.

7. The use of a composition of claim 1, wherein the at least one of the polyester polyol and polyether polyol has a molecular weight of at least 500 g/mol.

8. The use of a composition of claim 1, wherein the at least one of the polyester polyol and polyether polyol has a molecular weight of up to 3000 g/mol.

9. The use of a composition of claim 1, wherein the at least one of the polyester polyol and polyether polyol has a molecular weight of up to 1500 g/mol.

10. The use of a composition of claim 1, wherein the polyester polyol is derived from 1,6-hexanediol, neopentyl glycol, and adipic acid.

11. The use of a composition of claim 1, wherein the anionic water dispersability enhancing monomer comprises at least one of a carboxylic acid-containing diol and wherein the nonionic water dispersability enhancing monomer comprises a polyol having at least one pendent poly(alkylene oxide) side chain.

12. The use of a composition of claim 11, wherein the anionic water dispersability enhancing monomer comprises a carboxylic acid-containing diol.

13. The use of a composition of claim 12, wherein the carboxylic acid-containing diol comprises a dihydroxy-carboxylic acid.

14. The use of a composition of claim 12, wherein the neutralizing agent is present in sufficient amount to at least partially neutralize units of the polyurethane polymer derived from the carboxylic acid-containing diol.

15. The use of a composition of claim 12, wherein the carboxylic acid-containing diol comprises 2,2-bis(methylol) propionic acid.

16. The use of a composition of claim 1, wherein the water dispersability enhancing monomer has a molecular weight of up to 200 g/mol.

17. The use of a composition of claim 1, wherein the polyisocyanate comprises dicyclohexylmethane diisocyanate.

18. The use of a composition of claim 1, wherein the low molecular weight polyol has a molecular weight of less than 300 g/mol.

19. The use of a composition of claim 1, wherein the low molecular weight polyol comprises 1,4-butanediol.

20. The use of a composition of claim 1, wherein the non-reactive diluent comprises benzyl benzoate.

21. The use of a composition of claim 1, wherein the neutralizing agent comprises a tertiary amine.

22. The use of a composition of claim 1, wherein the chain extender comprises a polyamine.

23. The use of a composition of claim 1, wherein the (meth)acrylate monomer comprises a $C_1$-$C_5$ alkyl acrylate.

24. The use of a composition of claim 23, wherein the $C_1$-$C_5$ alkyl acrylate comprises methyl methacrylate and wherein units of the polyurethane hybrid polymer derived from the methyl methacrylate constitute no more than 32 wt. % of the hybrid polyurethane polymer.

25. The use of a composition of claim 23, wherein the $C_1$-$C_5$ alkyl acrylate comprises n-butyl acrylate.

26. The use of a composition of claim 1, wherein the vinyl aromatic monomer comprises styrene.

27. The use of a composition of claim 1, wherein the composition comprises the hybrid polymer and wherein a ratio of the polyurethane component B(1) to the addition polymer (B2) is from 10,000:1 to 1:1.

28. The use of a composition of claim 1, wherein the composition comprises the hybrid polymer and a ratio of the initiator, expressed in parts per hundred of the polymerizable ethylenically unsaturated monomers, to a concentration of units derived from the ethylenically unsaturated monomers in the hybrid polymer, expressed in wt. %, is less than 0.03.

29. The use of a composition of claim 1, wherein the at least one ethylenically unsaturated monomer is polymerized in the presence of an anionic polyurethane polymer which is the reaction product of at least the at least one of the polyester polyol and the polyether polyol; the water dispersability enhancing monomer; and the polyisocyanate.

30. The use of a composition of claim 1, wherein the particles comprise an anionic polyurethane polymer or an anionic polyurethane component which is the reaction product of:
    10-80 wt. %, of the at least one of the polyester polyol and polyether polyol;
    2-10 wt. % of a carboxylic acid-containing diol;
    0-9 wt. % of a polyol having at least one pendent poly(alkylene oxide) side chain;
    10-80 wt. % of the organic polyisocyanate;
    0-5 wt. % of the low molecular weight polyol;
    0-10 wt. % of the neutralizing agent; and
    0-7 wt. % of the chain extending polyamine.

31. The use of a composition of claim 1, wherein when the at least one of the polyether and polyether polyol is used at 40 wt. % or higher and wherein when the at least one of the polyether and polyether polyol is of molecular weight of 3000 g/mol or greater, the sum of portions of the low molecular weight polyol and the chain extender which are of molecular weight less than 100 g/mol, is less than 0.8 wt. %.

32. The use of a composition of claim 1 comprising applying the composition having at least 13 wt. % polyurethane or polyurethane hybrid polymer solids content (based on the weight of the total composition) to a hard surface to provide a dried film having a thickness of up to 50.8 μm and a Δ gloss of at least 20 units at an angle of 60°.

33. The use of a composition of claim 1 comprising applying the composition having at least 28 wt. % polyurethane or polyurethane hybrid polymer solids content (based on the weight of the total composition) to a hard surface to provide a dried film having a thickness of up to 25.4 μm and a Leneta gloss of at least 60 gloss units at an angle of 60°.

* * * * *